United States Patent
Jang et al.

(10) Patent No.: US 12,529,868 B2
(45) Date of Patent: Jan. 20, 2026

(54) OPTICAL IMAGING SYSTEM

(71) Applicant: SAMSUNG ELECTRO-MECHANICS CO., LTD., Suwon-si (KR)

(72) Inventors: Dong Hyuk Jang, Suwon-si (KR); Ji Su Lee, Suwon-si (KR); Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 404 days.

(21) Appl. No.: 17/981,682

(22) Filed: Nov. 7, 2022

(65) Prior Publication Data

US 2023/0168472 A1 Jun. 1, 2023

(30) Foreign Application Priority Data

Nov. 26, 2021 (KR) .................. 10-2021-0166009
Mar. 28, 2022 (KR) .................. 10-2022-0038123

(51) Int. Cl.
*G02B 9/64* (2006.01)
*G02B 3/04* (2006.01)
*G02B 13/00* (2006.01)

(52) U.S. Cl.
CPC ............... *G02B 9/64* (2013.01); *G02B 3/04* (2013.01); *G02B 13/0045* (2013.01)

(58) Field of Classification Search
None
See application file for complete search history.

(56) References Cited

U.S. PATENT DOCUMENTS

| | | | |
|---|---|---|---|
| 11,598,934 B2 | 3/2023 | Chen et al. | |
| 2014/0009843 A1* | 1/2014 | Tsai | G02B 9/64 359/708 |
| 2016/0306140 A1* | 10/2016 | Chen | G02B 9/64 |
| 2019/0204553 A1 | 7/2019 | Lian et al. | |
| 2019/0369361 A1* | 12/2019 | Yoo | H04N 23/55 |

(Continued)

FOREIGN PATENT DOCUMENTS

| | | |
|---|---|---|
| CN | 104950425 B | 1/2018 |
| CN | 109031628 A | 12/2018 |

(Continued)

OTHER PUBLICATIONS

Korean Office Action issued on Jul. 10, 2024, in counterpart Korean Patent Application No. 10-2022-0038123 (7 pages in English, 6 pages in Korean).

(Continued)

*Primary Examiner* — Darryl J Collins
(74) *Attorney, Agent, or Firm* — NSIP Law

(57) ABSTRACT

An optical imaging system includes a first lens, a second lens, a third lens, a fourth lens, a fifth lens, a sixth lens and a seventh lens disposed in order from an object side. The first lens has positive refractive power, and the second lens has negative refractive power. TTL/(2×IMG HT)<0.6 and −0.15<SAG52/f<0 are satisfied, where TTL is a distance from an object-side surface of the first lens to an imaging plane on an optical axis, IMG HT is half a diagonal length of the imaging plane, SAG52 is a fifth SAG value at an end of an effective diameter of an image-side surface of the fifth lens, and f is a total focal length the optical imaging system.

15 Claims, 20 Drawing Sheets

(56) References Cited

U.S. PATENT DOCUMENTS

| | | | |
|---|---|---|---|
| 2019/0369368 A1* | 12/2019 | Jung | G02B 7/022 |
| 2019/0391365 A1* | 12/2019 | Son | G02B 7/022 |
| 2021/0003829 A1 | 1/2021 | Dai et al. | |
| 2021/0048638 A1 | 2/2021 | Chen et al. | |
| 2021/0063695 A1 | 3/2021 | Hsieh et al. | |
| 2021/0063696 A1 | 3/2021 | Kamada et al. | |
| 2021/0149162 A1 | 5/2021 | Jhang et al. | |
| 2021/0149166 A1 | 5/2021 | Zhang et al. | |
| 2021/0356698 A1 | 11/2021 | Zhang et al. | |
| 2021/0364747 A1 | 11/2021 | Teranishi et al. | |
| 2021/0389575 A1* | 12/2021 | Li | G02B 9/64 |
| 2021/0405330 A1* | 12/2021 | Dang | G02B 9/64 |
| 2022/0163776 A1 | 5/2022 | Chen et al. | |
| 2022/0283410 A1 | 9/2022 | Li et al. | |
| 2022/0342186 A1* | 10/2022 | Wenren | G02B 13/0045 |
| 2022/0397742 A1 | 12/2022 | Zhang et al. | |

FOREIGN PATENT DOCUMENTS

| | | |
|---|---|---|
| CN | 110346919 A | 10/2019 |
| CN | 211086766 U | 7/2020 |
| CN | 112346214 A | 2/2021 |
| CN | 112965206 A | 6/2021 |
| CN | 113189752 A | 7/2021 |
| CN | 113341544 A | 9/2021 |
| CN | 113376810 A | 9/2021 |
| CN | 113655594 A | 11/2021 |
| JP | 2020-187221 A | 11/2020 |
| TW | 201638624 A | 11/2016 |
| TW | 201930944 A | 8/2019 |
| TW | I715235 B | 1/2021 |
| TW | 202119085 A | 5/2021 |

OTHER PUBLICATIONS

Taiwanese Office Action issued on Aug. 2, 2023, in counterpart Taiwanese Patent Application No. 111142681 (5 pages in English, 4 pages in Chinese).

Taiwanese Office Action Issued on Mar. 7, 2025, in Counterpart Taiwanese Patent Application No. 113135794 (5 Pages in English, 4 Pages in Chinese).

Korean Office Action Issued on Mar. 26, 2025, in Counterpart Korean Patent Application No. 10-2022-0038123 (5 Pages in English, 5 Pages in Korean).

Chinese Office Action Issued on May 23, 2025, in corresponding Chinese Patent Application No. 202211501206.3 (4 Pages in English, 8 Pages in Chinese).

Taiwanese Office Action issued on Nov. 11, 2025, in counterpart Taiwanese Patent Application No. 113135794. (13 pages in English, 12 pages in Taiwanese).

* cited by examiner

OPTICAL IMAGING SYSTEM

CROSS-REFERENCE TO RELATED APPLICATION(S)

This application claims benefit of priority to Korean Patent Application No. 10-2021-0166009 filed on Nov. 26, 2021, and Korean Patent Application No. 10-2022-0038123 filed on Mar. 28, 2022 in the Korean Intellectual Property Office, the disclosures of which are incorporated herein by reference in their entirety.

BACKGROUND

1. Field

The present disclosure relates to an optical imaging system.

2. Description of Related Art

Recent portable terminals include a camera equipped with an optical imaging system and a plurality of lenses to enable video calls and obtain images.

Also, as functions of a camera in a portable terminal have gradually increased, demand for a camera for a portable terminal having high resolution has increased.

Also, recently, an image sensor having a high pixel count (e.g., 13 million to 100 million pixels, or the like) has been employed in a camera for a portable terminal device to implement clearer image quality.

That is, a size of an image sensor has increased, and accordingly, an overall length of an optical system has also increased, such that a camera may protrude from a portable terminal device, which may be problematic.

It may be desirable for optical imaging systems with high resolution and relatively small size to be used in portable terminal devices and cameras.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens and a seventh lens disposed in order from an object side. The first lens has positive refractive power, and the second lens has negative refractive power. $TTL/(2 \times IMG\ HT) < 0.6$ and $-0.15 < SAG52/f < 0$ are satisfied, where TTL is a distance from an object-side surface of the first lens to an imaging plane on an optical axis, IMG HT is half a diagonal length of the imaging plane, SAG52 is a fifth SAG value at an end of an effective diameter of an image-side surface of the fifth lens, and f is a total focal length the optical imaging system.

In the optical imaging system, either one or both of $-0.15 < SAG62/f < 0$ and $-0.25 < SAG72/f < 0$ may be satisfied, wherein SAG62 is a sixth SAG value at an end of an effective diameter of an image-side surface of the sixth lens, and SAG72 is a seventh SAG value at an end of the effective diameter of an image-side surface of the seventh lens.

In the optical imaging system, at least three of the first to seventh lenses may have a refractive index greater than 1.61.

In the optical imaging system, each of the lenses having a refractive index greater than 1.61 may have negative refractive power.

In the optical imaging system, each of the second lens and the fourth lens may have a refractive index greater than 1.67 and negative refractive power.

In the optical imaging system, any one or any combination of any two or more of $25 < v1-v2 < 45$, $25 < v1-v4 < 45$, and $15 < v1-v6 < 25$ may be satisfied, wherein v1 is a first Abbe number of the first lens, v2 is a second Abbe number of the second lens, v4 is a fourth Abbe number of the fourth lens, and v6 is sixth Abbe number of the sixth lens.

In the optical imaging system, $0 < f1/f < 1.4$ and $-10 < f2/f < 0$ may be satisfied, where f1 is a first focal length of the first lens, and f2 is a second focal length of the second lens.

In the optical imaging system, $0 < f3/f < 50$ and $-50 < f4/f < 0$ may be satisfied, where f3 is a third focal length of the third lens, and f4 is a fourth focal length of the fourth lens.

In the optical imaging system, $|f5/f| > 3$, $0 < f6/f < 1.4$, and $-0.9 < f7/f < 0$ may be satisfied, where f5 is a fifth focal length of the fifth lens, f6 is a sixth focal length of the sixth lens, and f7 is a seventh focal length of the seventh lens.

In the optical imaging system, $TTL/f < 1.3$ and $BFL/f < 0.3$ may be satisfied, where BFL is a distance from an image-side surface of the seventh lens to the imaging plane on the optical axis.

In the optical imaging system, $D1/f < 0.1$ may be satisfied, where D1 is a distance between an image-side surface of the first lens and an object-side surface of the second lens on the optical axis.

In the optical imaging system, $FOV \times ((2 \times IMG\ HT)/f) \leq 170°$ may be satisfied, where FOV is a field of view of the optical imaging system.

In the optical imaging system, $(TTL/(2 \times IMG\ HT)) \times (TTL/f) < 0.62$ may be satisfied.

In the optical imaging system, $n2+n4+n5 > 4.8$ may be satisfied, where n2 is a second refractive index of the second lens, n4 is a fourth refractive index of the fourth lens, and n5 is a fifth refractive index of the fifth lens.

In the optical imaging system, the third lens may have positive refractive power, the fourth lens may have negative refractive power, the fifth lens may have negative refractive power, the sixth lens may have positive refractive power, and the seventh lens may have negative refractive power.

In the optical imaging system, the first lens may have a convex object-side surface and a concave image-side surface, the second lens may have a convex object-side surface and a concave image-side surface, and the third lens may have a convex object-side surface and a concave image-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
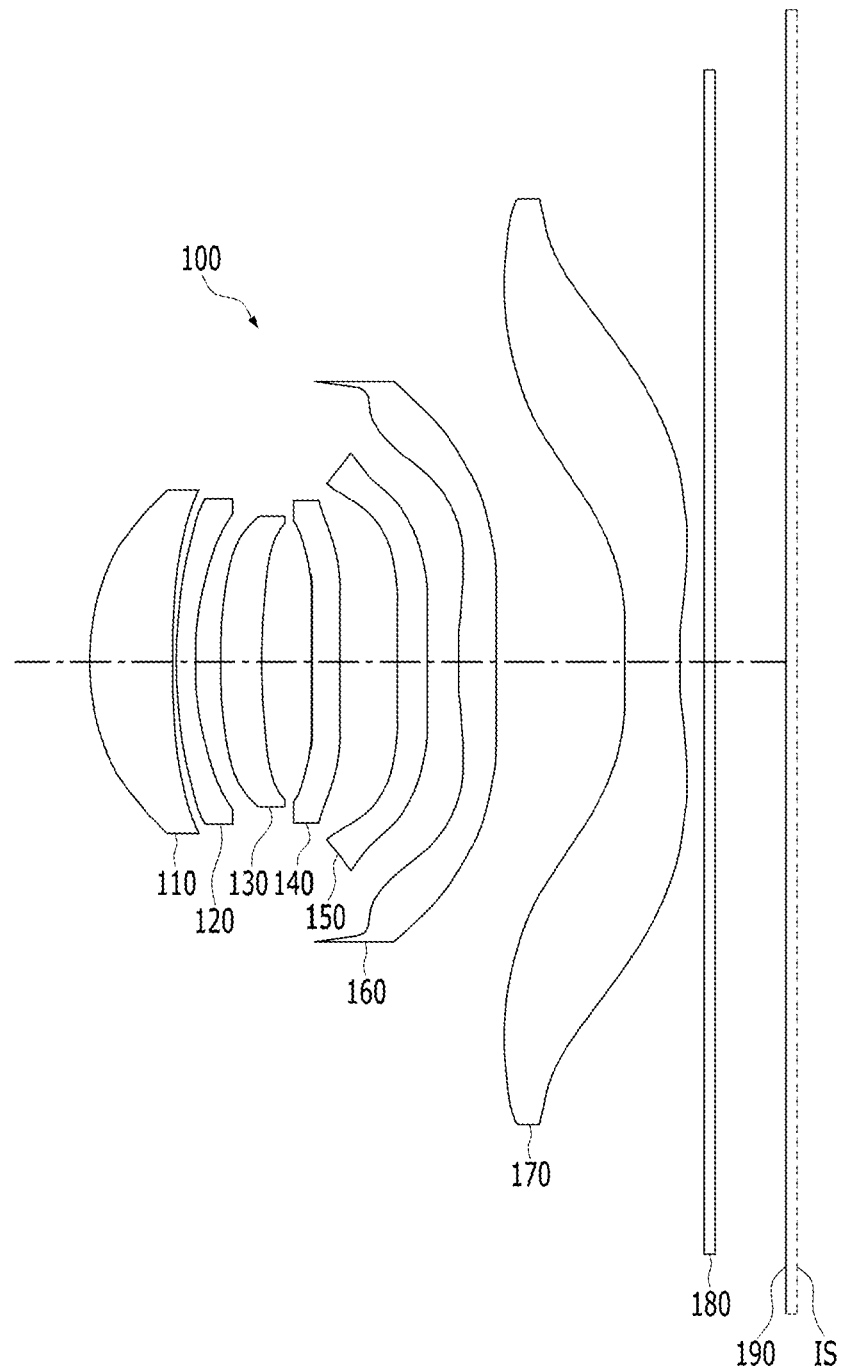
FIG. 1 is a diagram illustrating an optical imaging system according to a first example embodiment, according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the diagrams illustrating the lenses, a thickness, a size, and a shape of the lens are exaggerated to illustrate an example, and a spherical or an aspherical shape of the lens illustrated in the diagram is an example, and a shape is not limited thereto.

The first lens refers to the lens most adjacent to an object side, and the seventh lens refers to the lens most adjacent to an imaging plane (or an image sensor).

Also, in each lens, the first surface refers to a surface adjacent to an object side (or an object-side surface), and the second surface refers to a surface adjacent to an image side (or an image-side surface). Also, in example embodiments, units of numerical values for a radius of curvature, thickness, distance, focal length, or the like of the lens are millimeters, and a unit of a field of view (FOV) is degree.

Also, in the descriptions of the shape of each lens, the notion in which one surface is convex indicates that a paraxial region of the surface is convex, the notion in which one surface is concave indicates that a paraxial region of the surface is concave, and the notion that one surface is planar indicates that a paraxial region of the surface is planar. Therefore, even when it is described that one surface of the lens is convex, an edge portion of the lens may be concave. Similarly, even when it is described that one surface of the lens is concave, an edge portion of the lens may be convex. Also, when it is described that one surface of the lens is planar, an edge portion of the lens may be convex or concave.

The paraxial region refers to a relatively narrow region neighboring to an optical axis.

The imaging plane may refer to a virtual plane on which a focus may be formed by an optical imaging system. Alternatively, the imaging plane may refer to one surface of the image sensor on which light is received.

The optical imaging system in an example embodiment may include seven lenses.

For example, the optical system in an example embodiment may include a first lens, a second lens, a third lens, a fourth lens, a fifth lens, a sixth lens, and a seventh lens disposed in order from an object side. The first to seventh lenses may be spaced apart from each other by a predetermined distance along the optical axis.

However, the optical imaging system in an example embodiment may not simply include seven lenses, and may further include other components if desired.

For example, the optical imaging system may further include an image sensor for converting an incident image of a subject into an electrical signal.

Also, the optical imaging system may further include an infrared filter (hereinafter, referred to as a "filter") for blocking infrared rays. The filter may be disposed between the seventh lens and the image sensor.

Also, the optical imaging system may further include a stop for adjusting the amount of light.

The first to seventh lenses included in the optical imaging system in an example embodiment may be formed of a plastic material.

Also, at least one of the first to seventh lenses has an aspherical surface. Also, each of the first to seventh lenses may have at least one aspherical surface.

That is, at least one of the first and second surfaces of the first to seventh lenses may be aspherical. Here, the aspherical surfaces of the first to seventh lenses are represented by Equation 1.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30} \ldots$$ [Equation 1]

In Equation 1, c is a radius of curvature of the lens (a reciprocal of a radius of curvature), K is a conic constant, and Y is a distance from one point on the aspherical surface of the lens to the optical axis. Also, constants A to P refer to aspheric coefficients. Z (SAG) is a distance between one point on the aspherical surface of the lens and an apex of the aspherical surface in an optical axis direction.

The optical imaging system in an example embodiment may satisfy any one or any combination of any two or more of conditional expressions below:

| | |
|---|---|
| $0 < f1/f < 1.4$ | [Conditional Expression 1] |
| $25 < v1-v2 < 45$ | [Conditional Expression 2] |
| $25 < v1-v4 < 45$ | [Conditional Expression 3] |
| $15 < v1-v6 < 25$ | [Conditional Expression 4] |
| $-10 < f2/f < 0$ | [Conditional Expression 5] |
| $0 < f3/f < 50$ | [Conditional Expression 6] |
| $-50 < f4/f < 0$ | [Conditional Expression 7] |
| $|f5/f| > 3$ | [Conditional Expression 8] |
| $0 < f6/f < 1.4$ | [Conditional Expression 9] |
| $-0.9 < f7/f < 0$ | [Conditional Expression 10] |
| $TTL/f < 1.3$ | [Conditional Expression 11] |
| $-0.6 < f1/f2 < 0$ | [Conditional Expression 12] |
| $0 < f1/f3 < 0.4$ | [Conditional Expression 13] |
| $BFL/f < 0.3$ | [Conditional Expression 14] |
| $D1/f < 0.1$ | [Conditional Expression 15] |
| $TTL/(2 \times IMG\ HT) < 0.6$ | [Conditional Expression 16] |
| $FOV \times ((2 \times IMG\ HT)/f) \leq 170°$ | [Conditional Expression 17] |
| $(TTL/(2 \times IMG\ HT)) \times (TTL/f) < 0.62$ | [Conditional Expression 18] |
| $n2+n4+n5 > 4.8$ | [Conditional Expression 19] |
| $-0.15 < SAG52/f < 0$ | [Conditional Expression 20] |
| $-0.15 < SAG62/f < 0$ | [Conditional Expression 21] |
| $-0.25 < SAG72/f < 0$ | [Conditional Expression 22] |

In the conditional expressions, f is a total focal length of the optical imaging system, f1 is the focal length of the first lens, f2 is the focal length of the second lens, f3 is the focal length of the third lens, f4 is the focal length of the fourth lens, f5 is the focal length of the fifth lens, f6 is the focal length of the sixth lens, and f7 is the focal length of the seventh lens.

v1 is the Abbe number of the first lens, v2 is the Abbe number of the second lens, v4 is the Abbe number of the fourth lens, and v6 is the Abbe number of the sixth lens.

n2 is the refractive index of the second lens, n4 is the refractive index of the fourth lens, and n5 is the refractive index of the fifth lens.

TTL is the distance from the object-side surface of the first lens to the imaging plane on an optical axis, and BFL is the distance from the image-side surface of the seventh lens to the imaging plane on an optical axis.

D1 is the distance between the image-side surface of the first lens and the object-side surface of the second lens on the optical axis, IMG HT is half the diagonal length of the imaging plane, and FOV is the field of view of the optical imaging system.

SAG52 is the SAG value at an end of the effective diameter of the image-side surface of the fifth lens, SAG62 is the SAG value at an end of the effective diameter of the image-side surface of the sixth lens, and SAG72 is the SAG value at an end of the effective diameter of the image-side surface of the seventh lens.

When the SAG value has a negative value, the configuration indicates that an end of the effective diameter of the corresponding lens surface is disposed more adjacent to the object side than the apex of the corresponding lens surface.

When the SAG value has a positive value, the configuration indicates that an end of the effective diameter of the corresponding lens surface is disposed more adjacent to the image side than the apex of the corresponding lens surface.

First to seventh lenses included in the optical imaging system in an example embodiment will be described.

The first lens may have positive refractive power. Also, the first lens may have a meniscus shape convex toward the object side. In greater detail, the first surface of the first lens may be convex, and the second surface of the first lens may be concave.

At least one of the first surface and the second surface of the first lens may be aspherical. For example, both surfaces of the first lens may be aspherical.

The second lens may have negative refractive power. Also, the second lens may have a meniscus shape convex toward the object side. In greater detail, the first surface of the second lens may be convex, and the second surface of the second lens may be concave. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

At least one of the first surface and the second surface of the second lens may be aspherical. For example, both surfaces of the second lens may be aspherical.

The third lens may have positive refractive power. Also, the third lens may have a meniscus shape convex toward the object side. In greater detail, the first surface of the third lens may be convex, and the second surface of the third lens may be concave.

At least one of the first surface and the second surface of the third lens may be aspherical. For example, both surfaces of the third lens may be aspherical.

The fourth lens may have negative refractive power. Also, the fourth lens may have a meniscus shape convex toward the object side. In greater detail, the first surface of the fourth lens may be convex, and the second surface of the fourth lens may be concave.

Alternatively, both surfaces of the fourth lens may be concave. In greater detail, the first surface and the second surface of the fourth lens may be concave.

Alternatively, the fourth lens may have a meniscus shape convex toward the image. In greater detail, the first surface of the fourth lens may be concave, and the second surface of the fourth lens may be convex.

At least one of the first surface and the second surface of the fourth lens may be aspherical. For example, both surfaces of the fourth lens may be aspherical.

The fifth lens may have negative refractive power. Also, the fifth lens may have a meniscus shape convex toward the object side. In greater detail, the first surface of the fifth lens may be convex in the paraxial region, and the second surface of the fifth lens may be concave in the paraxial region.

At least one of the first surface and the second surface of the fifth lens may be aspherical. For example, both surfaces of the fifth lens may be aspherical.

The fifth lens may have at least one inflection point formed on at least one of the first surface and the second surface. For example, the first surface of the fifth lens may be convex in the paraxial region and may be concave in a portion other than the paraxial region. The second surface of the fifth lens may be concave in the paraxial region and may be convex in a portion other than the paraxial region.

The sixth lens may have positive refractive power. Also, both surfaces of the sixth lens may be convex. In greater detail, the first surface and the second surface of the sixth lens may be convex in the paraxial region.

At least one of the first surface and the second surface of the sixth lens may be aspherical. For example, both surfaces of the sixth lens may be aspherical.

The sixth lens may have at least one inflection point formed on at least one of the first surface and the second surface. For example, the first surface of the sixth lens may be convex in the paraxial region and may be concave in a portion other than the paraxial region. The second surface of the sixth lens may be convex in the paraxial region and may be concave in a portion other than the paraxial region.

The seventh lens may have negative refractive power. Also, both surfaces of the seventh lens may be concave. In greater detail, the first surface and the second surface of the seventh lens may be concave in the paraxial region.

Alternatively, the seventh lens may have a meniscus shape convex toward the object side. In greater detail, the first surface of the seventh lens may be convex in the paraxial region, and the second surface of the seventh lens may be concave in the paraxial region.

At least one of the first surface and the second surface of the seventh lens may be aspherical. For example, both surfaces of the seventh lens may be aspherical.

Also, at least one inflection point may be formed on at least one of the first surface and the second surface of the seventh lens. For example, the first surface of the seventh lens may be concave in the paraxial region and may be convex in a portion other than the paraxial region. The second surface of the seventh lens may be concave in the paraxial region and may be convex in a portion other than the paraxial region.

Each of the first to seventh lenses may be formed of a plastic material having optical properties different from those of adjacent lenses.

Meanwhile, at least three lenses among the first to seventh lenses may have a refractive index greater than 1.61. For example, the refractive indexes of the second lens, the fourth lens, and the fifth lens may be greater than 1.61. Also, a lens having a refractive index greater than 1.61 among the first to seventh lenses may have negative refractive power. For example, each of the second lens, the fourth lens, and the fifth lens may have a refractive index greater than 1.61 and may have negative refractive power.

A lens having negative refractive power among the first to fourth lenses may have a refractive index greater than 1.67. For example, the second lens and the fourth lens may have negative refractive power and a refractive index greater than 1.67.

An optical imaging system 100, according to a first example embodiment, will be described with reference to FIGS. 1 and 2.

The optical imaging system 100 in the first example embodiment may include an optical system including a first lens 110, a second lens 120, a third lens 130, a fourth lens 140, a fifth lens 150, a sixth lens 160, and a seventh lens 170, and may further include a filter 180 and an image sensor IS.

The optical imaging system 100 in the first example embodiment may form a focus on the imaging plane 190. The imaging plane 190 may refer to a surface on which the optical imaging system may form a focus. For example, the imaging plane 190 may refer to one surface of the image sensor IS on which light is received.

The lens characteristics of each lens (a radius of curvature, a thickness of the lens or a distance between the lenses, a refractive index, an Abbe number, and a focal length) are listed in Table 1.

The fourth lens 140 may have negative refractive power, a first surface of the fourth lens 140 may be convex, and a second surface of the fourth lens 140 may be concave.

The fifth lens 150 may have negative refractive power, the first surface of the fifth lens 150 may be convex in the paraxial region, and the second surface of the fifth lens 150 may be concave in the paraxial region.

Also, at least one inflection point may be formed on at least one of the first and second surfaces of the fifth lens 150. For example, the first surface of the fifth lens 150 may be convex in the paraxial region and may be concave in a portion other than the paraxial region. Also, the second surface of the fifth lens 150 may be concave in the paraxial region and may be convex in a portion other than the paraxial region.

The sixth lens 160 may have positive refractive power, and the first and second surfaces of the sixth lens 160 may be convex in the paraxial region.

Also, at least one inflection point may be formed on at least one of the first and second surfaces of the sixth lens 160. For example, the first surface of the sixth lens 160 may be convex in the paraxial region and may be concave in a portion other than the paraxial region. Also, the second surface of the sixth lens 160 may be convex in the paraxial region and may be concave in a portion other than the paraxial region.

The seventh lens 170 may have negative refractive power, and the first and second surfaces of the seventh lens 170 may be concave in the paraxial region.

TABLE 1

| Surface No. | Note | Radius of curvature | Thickness or distance | Refractive index | Abbe number | Focal length |
|---|---|---|---|---|---|---|
| S1 | First lens | 2.623 | 0.908 | 1.544 | 56.1 | 6.463924 |
| S2 | | 8.946 | 0.025 | | | |
| S3 | Second lens | 4.626 | 0.200 | 1.680 | 18.4 | −15.3395 |
| S4 | | 3.161 | 0.303 | | | |
| S5 | Third lens | 6.286 | 0.472 | 1.535 | 56.1 | 23.07 |
| S6 | | 12.424 | 0.553 | | | |
| S7 | Fourth lens | 83.603 | 0.313 | 1.680 | 18.4 | −97.78 |
| S8 | | 37.255 | 0.658 | | | |
| S9 | Fifth lens | 84.761 | 0.328 | 1.614 | 25.9 | −27.446 |
| S10 | | 14.151 | 0.359 | | | |
| S11 | Sixth lens | 5.897 | 0.413 | 1.567 | 38.0 | 9.766 |
| S12 | | −99.105 | 1.483 | | | |
| S13 | Seventh lens | −17.170 | 0.595 | 1.535 | 56.1 | −5.573 |
| S14 | | 3.670 | 0.300 | | | |
| S15 | Filter | Infinity | 0.110 | 1.518 | 64.2 | |
| S16 | | Infinity | 0.763 | | | |
| S17 | Imaging plane | Infinity | | | | |

The total focal length f of the optical imaging system 100 in the first example embodiment may be 7.48 mm, the IMG HT may be 7.145 mm, and the FOV may be 85°.

In the first example embodiment, the first lens 110 may have positive refractive power, the first surface of the first lens 110 may be convex, and the second surface of the first lens 110 may be concave.

The second lens 120 may have negative refractive power, a first surface of the second lens 120 may be convex, and a second surface of the second lens 120 may be concave.

The third lens 130 may have positive refractive power, a first surface of the third lens 130 may be convex, and a second surface of the third lens 130 may be concave.

Also, at least one inflection point may be formed on at least one of the first and second surfaces of the seventh lens 170. For example, the first surface of the seventh lens 170 may be concave in the paraxial region and may be convex in a portion other than the paraxial region. Also, the second surface of the seventh lens 170 may be concave in the paraxial region and may be convex in a portion other than the paraxial region.

Each surface of the first lens 110 to the seventh lens 170 may have an aspherical coefficient as in Table 2. For example, both the object-side surface and the image-side surface of the first lens 110 to the seventh lens 170 may be aspherical.

TABLE 2

| | S1 | S2 | S3 | S4 | S5 | S6 | S7 |
|---|---|---|---|---|---|---|---|
| Conic constant(K) | −0.857 | 20.487 | −19.636 | −5.362 | 6.570 | 9.834 | −99.000 |
| 4th coefficient(A) | 1.239E−01 | −2.177E−02 | 3.552E−02 | 2.794E−02 | 7.274E−02 | 6.702E−02 | −2.401E−01 |
| 6th coefficient(B) | 3.424E−03 | −9.392E−03 | 1.248E−02 | 1.653E−02 | 2.623E−02 | 2.174E−02 | −7.778E−03 |
| 8th coefficient(C) | −1.153E−03 | −9.081E−03 | −5.317E−03 | −4.821E−03 | 1.528E−03 | 3.626E−03 | −6.102E−03 |
| 10th coefficient(D) | −1.932E−03 | −1.532E−03 | 2.146E−03 | 3.261E−04 | 6.273E−05 | 5.671E−04 | −7.217E−03 |
| 12th coefficient(E) | −9.627E−04 | −2.184E−03 | −8.306E−04 | −7.394E−05 | −5.346E−05 | 7.421E−05 | −6.548E−03 |
| 14th coefficient(F) | −5.990E−04 | −2.857E−05 | 4.144E−04 | 1.644E−04 | 8.222E−05 | 1.149E−05 | −5.549E−03 |
| 16th coefficient(G) | −1.648E−04 | −2.300E−04 | −6.002E−05 | 5.328E−05 | −4.990E−06 | −4.532E−07 | −4.237E−03 |
| 18th coefficient(H) | −8.450E−05 | −4.251E−05 | 6.566E−06 | −2.640E−05 | 1.406E−05 | 1.647E−06 | −3.170E−03 |
| 20th coefficient(J) | 5.673E−06 | −2.188E−05 | 6.223E−06 | 1.086E−05 | −1.574E−05 | −3.023E−06 | −2.128E−03 |
| 22nd coefficient(L) | −1.442E−05 | −3.888E−05 | −1.815E−05 | −1.474E−05 | 9.109E−06 | 3.430E−06 | −1.410E−03 |
| 24th coefficient(M) | 8.547E−06 | 1.874E−05 | 2.241E−05 | 1.104E−05 | −3.685E−06 | −2.464E−06 | −8.146E−04 |
| 26th coefficient(N) | −1.365E−05 | −3.107E−05 | −1.311E−05 | −6.636E−06 | 3.248E−06 | 1.748E−06 | −4.536E−04 |
| 28th coefficient(O) | 8.107E−06 | 1.071E−05 | 5.232E−06 | 4.626E−06 | −1.656E−06 | −1.327E−06 | −1.993E−04 |
| 30th coefficient(P) | −3.882E−06 | −1.030E−05 | −1.475E−06 | −1.358E−06 | 2.768E−07 | 2.234E−07 | −7.604E−05 |

| | S8 | S9 | S10 | S11 | S12 | S13 | S14 |
|---|---|---|---|---|---|---|---|
| Conic constant(K) | −97.615 | −99.000 | 15.443 | 2.294 | −46.284 | −29.100 | −19.085 |
| 4th coefficient(A) | −3.470E−01 | −9.689E−01 | −1.580E+00 | −2.338E+00 | −1.120E+00 | −1.494E+00 | −3.523E+00 |
| 6th coefficient(B) | 2.447E−02 | −3.777E−02 | 2.911E−01 | 2.590E−01 | 3.903E−02 | 1.153E+00 | 1.081E+00 |
| 8th coefficient(C) | 1.419E−02 | 6.072E−02 | 4.886E−02 | 1.006E−01 | 7.237E−03 | −6.181E−01 | −2.053E−01 |
| 10th coefficient(D) | 2.892E−03 | 5.302E−02 | −1.140E−02 | −1.215E−03 | −4.935E−03 | 2.946E−01 | 8.379E−02 |
| 12th coefficient(E) | −2.499E−03 | 5.018E−03 | −2.257E−02 | −2.233E−02 | 2.161E−02 | −1.222E−01 | −6.248E−02 |
| 14th coefficient(F) | −2.976E−03 | −1.268E−02 | 1.211E−02 | −1.317E−02 | −3.634E−04 | 3.333E−02 | 2.303E−02 |
| 16th coefficient(G) | −2.088E−03 | −1.149E−02 | 6.725E−03 | 6.247E−03 | 3.861E−03 | −5.861E−03 | −1.381E−02 |
| 18th coefficient(H) | −9.637E−04 | −2.869E−03 | −7.019E−03 | 6.015E−03 | 2.795E−03 | 1.669E−03 | 6.738E−03 |
| 20th coefficient(J) | −3.202E−04 | 3.988E−03 | −8.265E−03 | −1.939E−03 | −1.592E−03 | −3.472E−03 | −5.404E−03 |
| 22nd coefficient(L) | −7.021E−05 | 7.057E−03 | −2.323E−03 | −1.420E−03 | −1.835E−05 | 5.264E−03 | 4.275E−03 |
| 24th coefficient(M) | −2.018E−05 | 6.462E−03 | −7.608E−04 | 7.438E−05 | −1.385E−04 | −4.506E−03 | −2.022E−03 |
| 26th coefficient(N) | −3.969E−05 | 4.093E−03 | −1.649E−03 | 3.138E−04 | −2.270E−04 | 3.030E−03 | 8.683E−04 |
| 28th coefficient(O) | −3.269E−05 | 1.731E−03 | −1.599E−03 | 5.532E−05 | −9.678E−05 | −1.391E−03 | −4.841E−04 |
| 30th coefficient(P) | −2.100E−05 | 3.844E−04 | −5.523E−04 | −5.381E−05 | −5.632E−06 | 3.711E−04 | 3.339E−04 |

Figure 2:
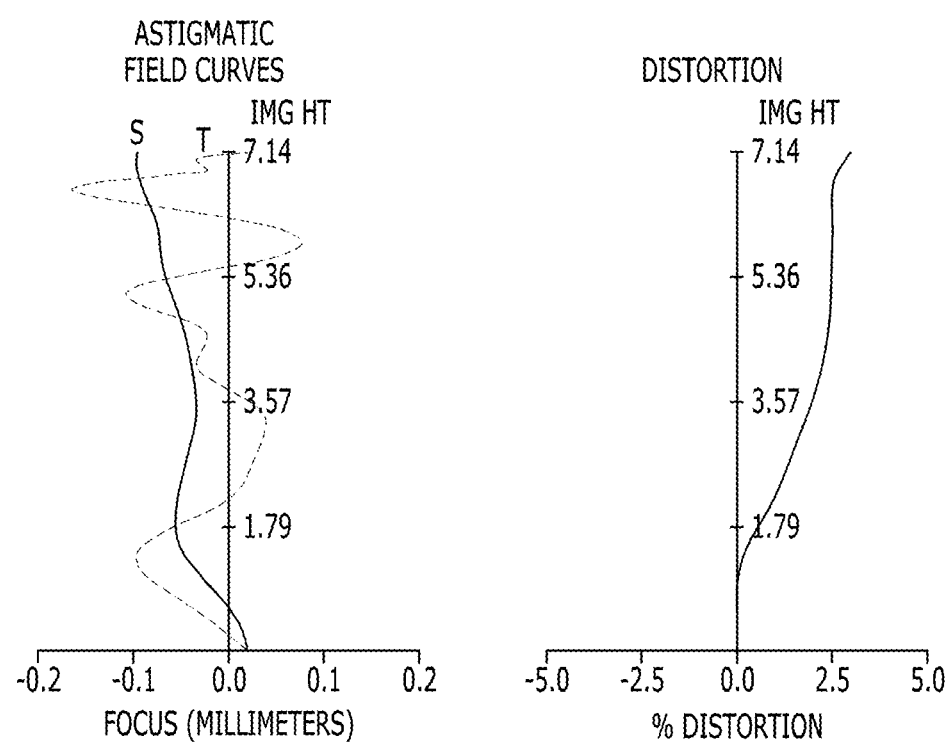
FIG. 2 is curves indicating aberration properties of the optical imaging system illustrated in FIG. 1.

Also, the optical imaging system configured as described above may have the aberration characteristics illustrated in FIG. 2.

Figure 3:
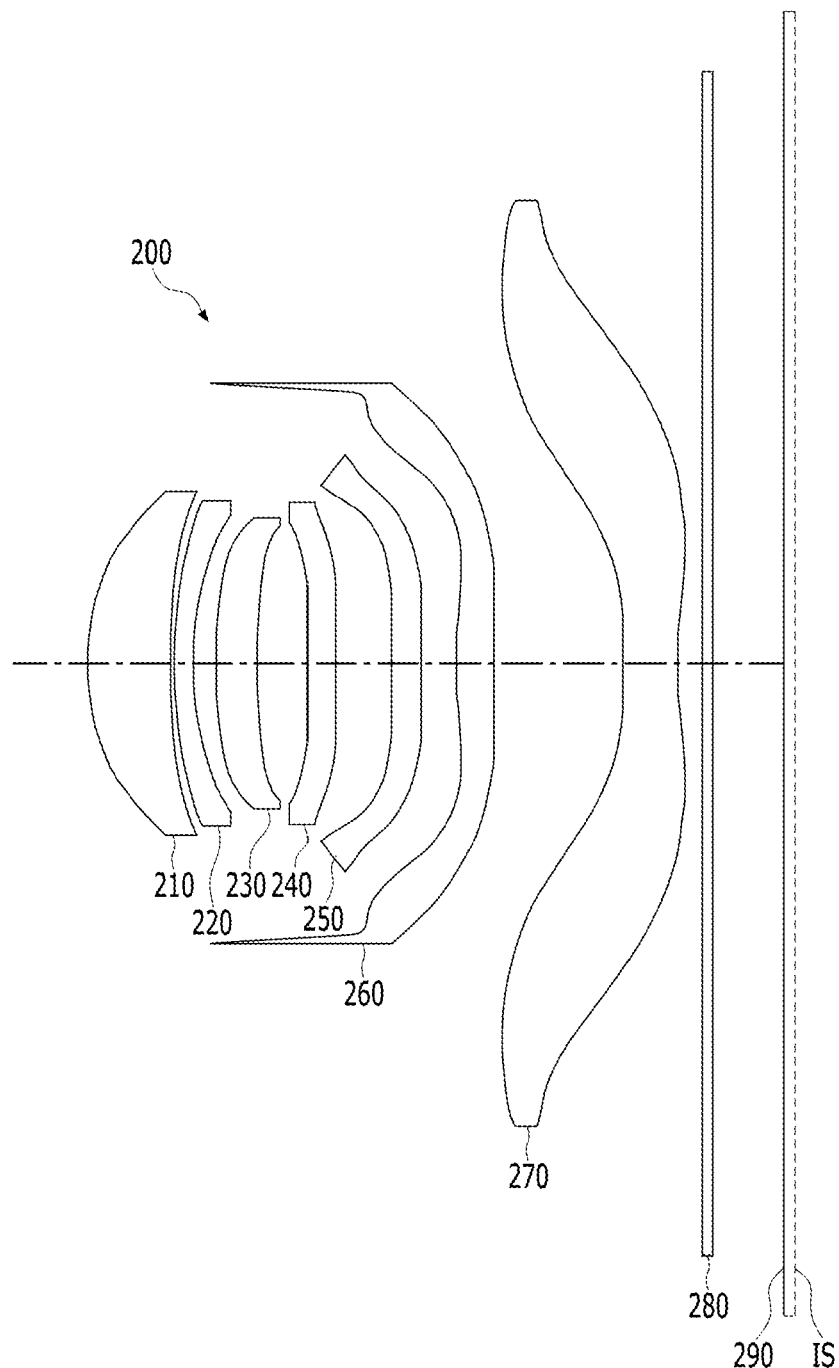
FIG. 3 is a diagram illustrating an optical imaging system according to a second example embodiment, according to one or more embodiments.

An optical imaging system 200, according to a second example embodiment, will be described with reference to FIGS. 3 and 4.

The optical imaging system 200 in the second example embodiment may include an optical system including a first lens 210, a second lens 220, a third lens 230, a fourth lens 240, a fifth lens 250, a sixth lens 260, and a seventh lens 270, and may further include a filter 280 and an image sensor IS.

The optical imaging system 200 in the second example embodiment may form a focus on the imaging plane 290. The imaging plane 290 may refer to a surface on which the optical imaging system may form a focus. For example, the imaging plane 290 may refer to one surface of the image sensor IS on which light is received.

The lens characteristics of each lens (a radius of curvature, a thickness of the lens or a distance between the lenses, a refractive index, an Abbe number, and a focal length) are listed in Table 3.

TABLE 3

| Surface No. | Note | Radius of curvature | Thickness or distance | Refractive index | Abbe number | Focal length |
|---|---|---|---|---|---|---|
| S1 | First lens | 2.625 | 0.894 | 1.544 | 56.1 | 6.463924 |
| S2 | | 8.953 | 0.025 | | | |
| S3 | Second lens | 4.758 | 0.200 | 1.680 | 18.4 | −15.3395 |
| S4 | | 3.196 | 0.277 | | | |
| S5 | Third lens | 6.106 | 0.487 | 1.535 | 56.1 | 23.07 |
| S6 | | 11.674 | 0.552 | | | |
| S7 | Fourth lens | 62.938 | 0.290 | 1.680 | 18.4 | −97.78 |
| S8 | | 35.665 | 0.657 | | | |
| S9 | Fifth lens | 82.391 | 0.332 | 1.614 | 25.9 | −27.446 |
| S10 | | 14.074 | 0.380 | | | |
| S11 | Sixth lens | 5.907 | 0.423 | 1.567 | 38.0 | 9.766 |
| S12 | | −112.805 | 1.556 | | | |
| S13 | Seventh lens | −19.437 | 0.548 | 1.535 | 56.1 | −5.573 |
| S14 | | 3.607 | 0.300 | | | |
| S15 | Filter | Infinity | 0.110 | 1.518 | 64.2 | |
| S16 | | Infinity | 0.752 | | | |
| S17 | Imaging plane | Infinity | | | | |

The total focal length f of the optical imaging system 200 in the second example embodiment may be 7.48 mm, the IMG HT may be 7.145 mm, and the FOV may be 85°.

In the second example embodiment, the first lens 210 may have positive refractive power, the first surface of the first lens 210 may be convex, and the second surface of the first lens 210 may be concave.

The second lens 220 may have negative refractive power, a first surface of the second lens 220 may be convex, and a second surface of the second lens 220 may be concave.

The third lens 230 may have positive refractive power, a first surface of the third lens 230 may be convex, and a second surface of the third lens 230 may be concave.

The fourth lens 240 may have negative refractive power, a first surface of the fourth lens 240 may be convex, and a second surface of the fourth lens 240 may be concave.

The fifth lens 250 may have negative refractive power, the first surface of the fifth lens 250 may be convex in the paraxial region, and the second surface of the fifth lens 250 may be concave in the paraxial region.

Also, at least one inflection point may be formed on at least one of the first and second surfaces of the fifth lens 250. For example, the first surface of the fifth lens 250 may be convex in the paraxial region and may be concave in a portion other than the paraxial region. Also, the second surface of the fifth lens 250 may be concave in the paraxial region and may be convex in a portion other than the paraxial region.

The sixth lens 260 may have positive refractive power, and the first and second surfaces of the sixth lens 260 may be convex in the paraxial region.

Also, at least one inflection point may be formed on at least one of the first and second surfaces of the sixth lens 260. For example, the first surface of the sixth lens 260 may be convex in the paraxial region and may be concave in a portion other than the paraxial region. Also, the second surface of the sixth lens 260 may be convex in the paraxial region and may be concave in a portion other than the paraxial region.

The seventh lens 270 may have negative refractive power, and the first and second surfaces of the seventh lens 270 may be concave in the paraxial region.

Also, at least one inflection point may be formed on at least one of the first and second surfaces of the seventh lens 270. For example, the first surface of the seventh lens 270 may be concave in the paraxial region and may be convex in a portion other than the paraxial region. Also, the second surface of the seventh lens 270 may be concave in the paraxial region and may be convex in a portion other than the paraxial region.

Each surface of the first lens 210 to the seventh lens 270 may have an aspherical coefficient as in Table 4. For example, both the object-side surface and the image-side surface of the first lens 210 to the seventh lens 270 may be aspherical.

TABLE 4

| | S1 | S2 | S3 | S4 | S5 | S6 | S7 |
|---|---|---|---|---|---|---|---|
| Conic constant(K) | −0.911 | 20.601 | −19.837 | −5.544 | 5.339 | 11.641 | −99.000 |
| 4th coefficient(A) | 1.224E−01 | −2.144E−02 | 3.547E−02 | 2.668E−02 | 7.235E−02 | 6.725E−02 | −2.370E−01 |
| 6th coefficient(B) | 2.364E−03 | −9.882E−03 | 1.069E−02 | 1.514E−02 | 2.613E−02 | 2.163E−02 | −9.143E−03 |
| 8th coefficient(C) | −1.868E−03 | −8.788E−03 | −4.808E−03 | −4.553E−03 | 1.702E−03 | 3.554E−03 | −7.457E−03 |
| 10th coefficient(D) | −2.121E−03 | −1.281E−03 | 2.226E−03 | 2.239E−04 | −2.317E−05 | 5.379E−04 | −7.863E−03 |
| 12th coefficient(E) | −1.135E−03 | −2.323E−03 | −8.876E−04 | −7.717E−05 | −6.513E−05 | 2.642E−05 | −7.090E−03 |
| 14th coefficient(F) | −6.604E−04 | −1.126E−04 | 3.800E−04 | 1.805E−04 | 7.216E−05 | 1.079E−05 | −5.739E−03 |
| 16th coefficient(G) | −2.424E−04 | −2.995E−04 | −8.488E−05 | 5.338E−05 | −3.598E−06 | −1.878E−05 | −4.298E−03 |

TABLE 4-continued

|  | | | | | | | |
|---|---|---|---|---|---|---|---|
| 18th coefficient(H) | −9.996E−05 | −2.051E−05 | 1.412E−05 | −2.814E−05 | 8.770E−06 | −9.770E−07 | −3.135E−03 |
| 20th coefficient(J) | −1.352E−05 | −2.484E−05 | 9.327E−06 | 1.417E−05 | −1.230E−05 | −4.896E−06 | −2.085E−03 |
| 22nd coefficient(L) | −1.099E−05 | −2.617E−05 | −1.693E−05 | −1.466E−05 | 9.624E−06 | 5.473E−06 | −1.351E−03 |
| 24th coefficient(M) | −4.745E−07 | 1.199E−05 | 2.504E−05 | 1.375E−05 | −3.802E−06 | −7.104E−06 | −7.694E−04 |
| 26th coefficient(N) | −6.869E−06 | −3.012E−05 | −1.257E−05 | −7.759E−06 | 2.982E−06 | 4.593E−06 | −4.182E−04 |
| 28th coefficient(O) | 4.833E−06 | 1.689E−06 | 4.272E−06 | 4.320E−06 | −1.683E−06 | 3.811E−07 | −1.813E−04 |
| 30th coefficient(P) | −6.909E−06 | −1.053E−05 | −1.769E−06 | −1.336E−06 | 3.125E−07 | −9.471E−07 | −6.532E−05 |

|  | S8 | S9 | S10 | S11 | S12 | S13 | S14 |
|---|---|---|---|---|---|---|---|
| Conic constant(K) | −12.135 | 62.143 | 16.029 | 2.364 | −99.000 | −13.325 | −18.392 |
| 4th coefficient(A) | −3.458E−01 | −9.528E−01 | −1.571E+00 | −2.338E+00 | −1.124E+00 | −1.507E+00 | −3.482E+00 |
| 6th coefficient(B) | 2.334E−02 | −3.129E−02 | 2.851E−01 | 2.571E−01 | 2.947E−02 | 1.163E+00 | 1.057E+00 |
| 8th coefficient(C) | 1.257E−02 | 6.022E−02 | 4.323E−02 | 1.015E−01 | 1.039E−02 | −6.297E−01 | −2.207E−01 |
| 10th coefficient(D) | 1.729E−03 | 5.321E−02 | −1.017E−02 | −2.537E−03 | −5.874E−03 | 2.856E−01 | 8.434E−02 |
| 12th coefficient(E) | −3.080E−03 | 3.896E−03 | −2.204E−02 | −2.190E−02 | 2.284E−02 | −1.199E−01 | −6.928E−02 |
| 14th coefficient(F) | −2.770E−03 | −1.273E−02 | 1.375E−02 | −1.136E−02 | 2.010E−03 | 3.555E−02 | 2.362E−02 |
| 16th coefficient(G) | −1.616E−03 | −1.074E−02 | 6.368E−03 | 5.863E−03 | 4.029E−03 | −6.608E−03 | −1.372E−02 |
| 18th coefficient(H) | −4.798E−04 | −2.179E−03 | −8.330E−03 | 5.586E−03 | 3.807E−03 | 3.932E−03 | 9.957E−03 |
| 20th coefficient(J) | 6.884E−05 | 3.760E−03 | −8.883E−03 | −2.106E−03 | −7.595E−04 | −5.372E−03 | −5.384E−03 |
| 22nd coefficient(L) | 2.092E−04 | 5.804E−03 | −1.327E−03 | −1.632E−03 | −2.657E−04 | 6.433E−03 | 3.732E−03 |
| 24th coefficient(M) | 1.535E−04 | 4.914E−03 | 8.744E−04 | 2.637E−04 | −2.318E−04 | −5.016E−03 | −2.083E−03 |
| 26th coefficient(N) | 6.942E−05 | 2.891E−03 | −6.180E−04 | 4.570E−04 | −3.318E−04 | 2.763E−03 | 9.186E−04 |
| 28th coefficient(O) | 1.920E−05 | 1.108E−03 | −1.278E−03 | 9.244E−06 | −2.453E−04 | −9.938E−04 | −3.946E−04 |
| 30th coefficient(P) | 2.998E−06 | 1.931E−04 | −5.013E−04 | −9.121E−05 | −6.323E−05 | 1.930E−04 | 1.223E−04 |

Figure 4:
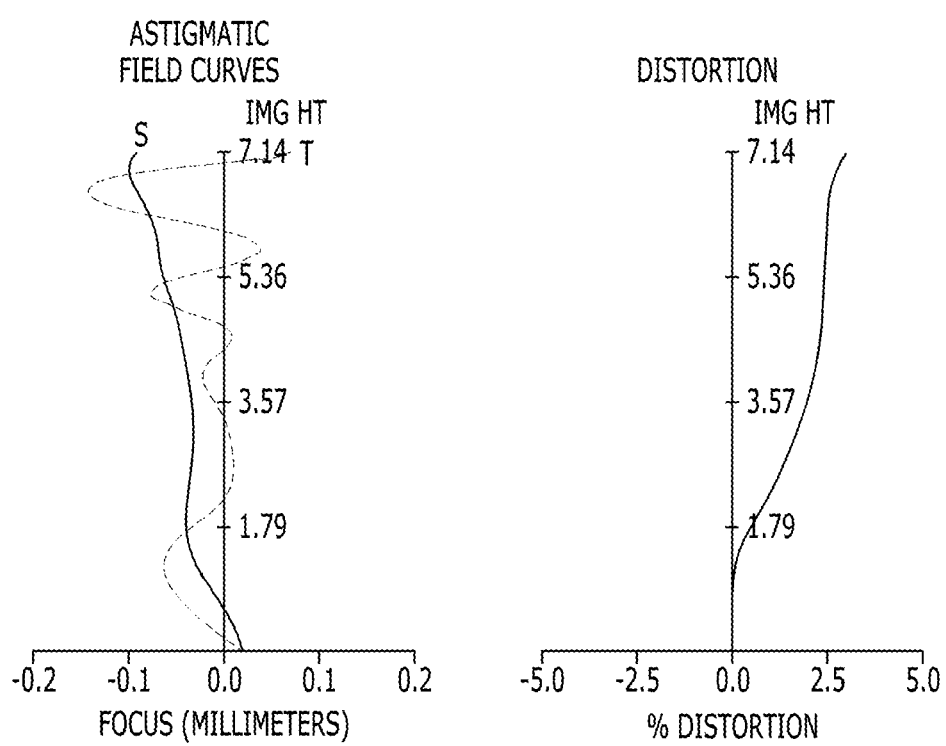
FIG. 4 is curves indicating aberration properties of the optical imaging system illustrated in FIG. 3.

Also, the optical imaging system configured as described above may have the aberration characteristics illustrated in FIG. 4.

Figure 5:
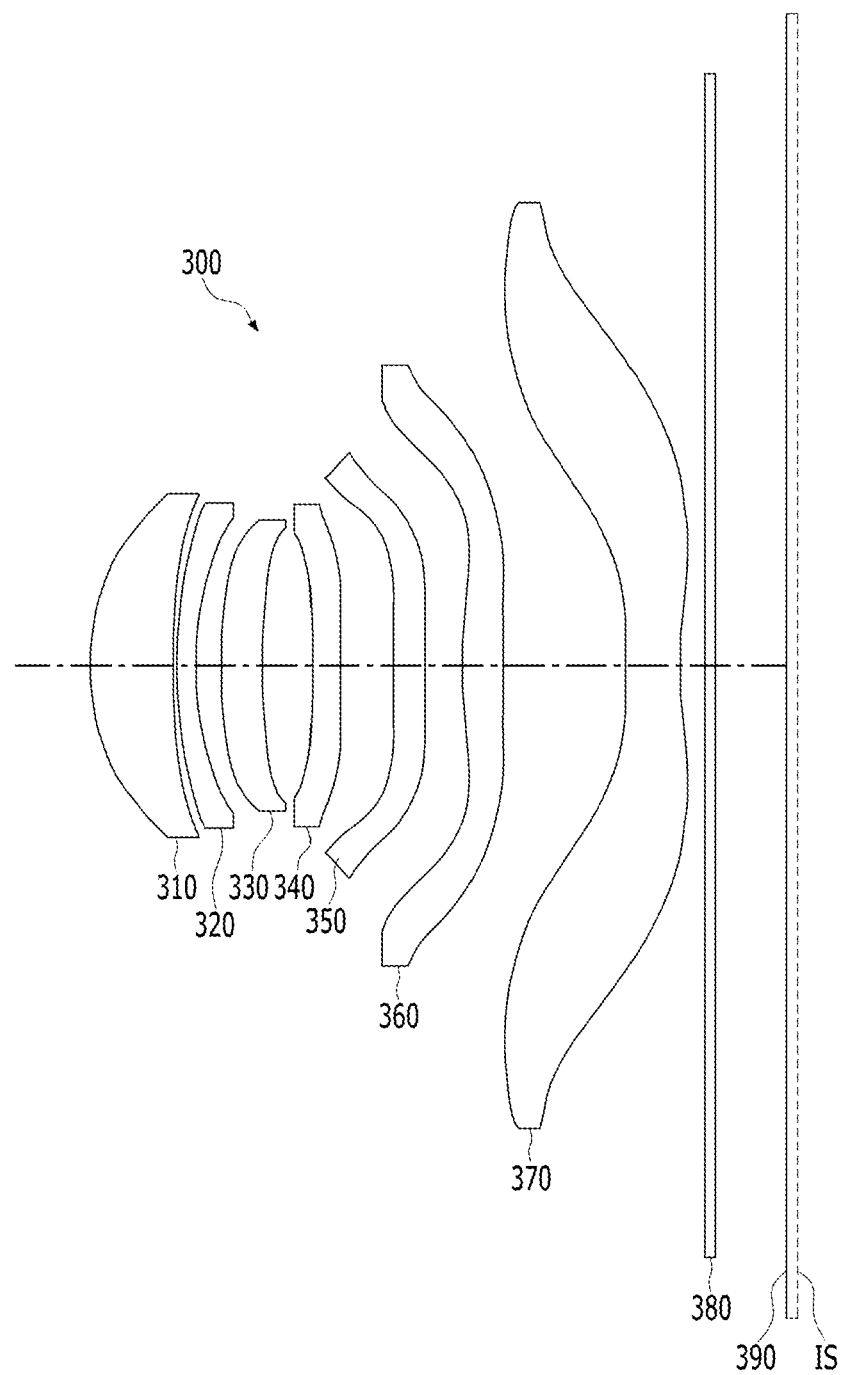
FIG. 5 is a diagram illustrating an optical imaging system according to a third example embodiment, according to one or more embodiments.

An optical imaging system 300, according to a third example embodiment, will be described with reference to FIGS. 5 and 6.

The optical imaging system 300 in the third example embodiment may include an optical system including a first lens 310, a second lens 320, a third lens 330, a fourth lens 340, a fifth lens 350, a sixth lens 360, and a seventh lens 370, and may further include a filter 380 and an image sensor IS.

The optical imaging system 300 in the third example embodiment may form a focus on the imaging plane 390. The imaging plane 390 may refer to a surface on which the optical imaging system may form a focus. For example, the imaging plane 390 may refer to one surface of the image sensor IS on which light is received.

The lens characteristics of each lens (a radius of curvature, a thickness of the lens or a distance between the lenses, a refractive index, an Abbe number, and a focal length) are listed in Table 5.

TABLE 5

| Surface No. | Note | Radius of curvature | Thickness or distance | Refractive index | Abbe number | Focal length |
|---|---|---|---|---|---|---|
| S1 | First lens | 2.643 | 0.861 | 1.544 | 56.1 | 6.463924 |
| S2 |  | 9.093 | 0.060 |  |  |  |
| S3 | Second lens | 5.027 | 0.258 | 1.680 | 18.4 | −15.3395 |
| S4 |  | 3.301 | 0.205 |  |  |  |
| S5 | Third lens | 6.513 | 0.509 | 1.535 | 56.1 | 23.07 |
| S6 |  | 15.119 | 0.529 |  |  |  |
| S7 | Fourth lens | −42.233 | 0.349 | 1.680 | 18.4 | −97.78 |
| S8 |  | 541.701 | 0.603 |  |  |  |
| S9 | Fifth lens | 16.957 | 0.340 | 1.614 | 25.9 | −27.446 |
| S10 |  | 8.782 | 0.427 |  |  |  |

TABLE 5-continued

| Surface No. | Note | Radius of curvature | Thickness or distance | Refractive index | Abbe number | Focal length |
|---|---|---|---|---|---|---|
| S11 | Sixth lens | 5.954 | 0.450 | 1.567 | 38.0 | 9.766 |
| S12 | | −31.294 | 1.411 | | | |
| S13 | Seventh lens | −24.662 | 0.579 | 1.535 | 56.1 | −5.573 |
| S14 | | 3.420 | 0.300 | | | |
| S15 | Filter | Infinity | 0.110 | 1.518 | 64.2 | |
| S16 | | Infinity | 0.796 | | | |
| S17 | Imaging plane | Infinity | | | | |

The total focal length f of the optical imaging system 300 in the third example embodiment may be 7.48 mm, the IMG HT may be 7.145 mm, and the FOV may be 86°.

In the third example embodiment, the first lens 310 may have positive refractive power, the first surface of the first lens 310 may be convex, and the second surface of the first lens 310 may be concave.

The second lens 320 may have negative refractive power, a first surface of the second lens 320 may be convex, and a second surface of the second lens 320 may be concave.

The third lens 330 may have positive refractive power, a first surface of the third lens 330 may be convex, and a second surface of the third lens 330 may be concave.

The fourth lens 340 may have negative refractive power, and first and second surfaces of the fourth lens 340 may be concave.

The fifth lens 350 may have negative refractive power, the first surface of the fifth lens 350 may be convex in the paraxial region, and the second surface of the fifth lens 350 may be concave in the paraxial region.

Also, at least one inflection point may be formed on at least one of the first and second surfaces of the fifth lens 350. For example, the first surface of the fifth lens 350 may be convex in the paraxial region and may be concave in a portion other than the paraxial region. Also, the second surface of the fifth lens 350 may be concave in the paraxial region and may be convex in a portion other than the paraxial region.

The sixth lens 360 may have positive refractive power, and the first and second surfaces of the sixth lens 360 may be convex in the paraxial region.

Also, at least one inflection point may be formed on at least one of the first and second surfaces of the sixth lens 360. For example, the first surface of the sixth lens 360 may be convex in the paraxial region and may be concave in a portion other than the paraxial region. Also, the second surface of the sixth lens 360 may be convex in the paraxial region and may be concave in a portion other than the paraxial region.

The seventh lens 370 may have negative refractive power, and the first and second surfaces of the seventh lens 370 may be concave in the paraxial region.

Also, at least one inflection point may be formed on at least one of the first and second surfaces of the seventh lens 370. For example, the first surface of the seventh lens 370 may be concave in the paraxial region and may be convex in a portion other than the paraxial region. The second surface of the seventh lens 370 may be concave in the paraxial region and may be convex in a portion other than the paraxial region.

Each surface of the first lens 310 to the seventh lens 370 may have an aspherical coefficient as in Table 6. For example, both the object-side surface and the image-side surface of the first lens 310 to the seventh lens 370 may be aspherical.

TABLE 6

| | S1 | S2 | S3 | S4 | S5 | S6 | S7 |
|---|---|---|---|---|---|---|---|
| Conic constant(K) | −0.994 | 21.296 | −22.996 | −5.805 | 5.257 | 35.044 | 95.823 |
| 4th coefficient(A) | 1.159E−01 | −2.068E−02 | 4.123E−02 | 2.402E−02 | 7.600E−02 | 7.778E−02 | −2.016E−01 |
| 6th coefficient(B) | −2.500E−03 | −1.367E−02 | 4.226E−03 | 9.564E−03 | 2.203E−02 | 2.005E−02 | −1.179E−02 |
| 8th coefficient(C) | −4.969E−03 | −9.425E−03 | −9.176E−04 | −2.122E−03 | 1.087E−03 | 2.876E−03 | −9.649E−03 |
| 10th coefficient(D) | −3.545E−03 | −2.904E−03 | 1.011E−03 | 3.115E−04 | −6.630E−05 | 1.521E−04 | −9.313E−03 |
| 12th coefficient(E) | −1.601E−03 | −1.631E−03 | −3.519E−04 | 2.327E−04 | −1.657E−04 | −1.202E−04 | −8.078E−03 |
| 14th coefficient(F) | −6.721E−04 | −2.607E−06 | 3.728E−04 | 3.228E−04 | 9.997E−05 | −6.997E−05 | −6.522E−03 |
| 16th coefficient(G) | −1.250E−04 | −9.137E−05 | −2.014E−05 | 2.446E−05 | −1.280E−05 | −3.847E−05 | −4.868E−03 |
| 18th coefficient(H) | −2.642E−05 | −2.445E−05 | 1.380E−05 | −3.987E−05 | 1.422E−05 | −2.045E−05 | −3.588E−03 |
| 20th coefficient(J) | 2.629E−05 | −4.622E−05 | −1.328E−05 | 3.829E−06 | −2.257E−05 | −6.683E−06 | −2.419E−03 |
| 22nd coefficient(L) | −1.116E−05 | −2.296E−05 | 3.208E−06 | −2.435E−06 | 1.747E−05 | 2.283E−06 | −1.605E−03 |
| 24th coefficient(M) | 4.435E−06 | −1.249E−05 | −1.919E−06 | 1.132E−06 | −4.305E−06 | −5.959E−06 | −9.370E−04 |
| 26th coefficient(N) | −1.095E−05 | −1.171E−05 | −2.538E−06 | −4.439E−06 | 1.840E−06 | 4.331E−07 | −5.251E−04 |

TABLE 6-continued

|  |  |  |  |  |  |  |  |
|---|---|---|---|---|---|---|---|
| 28th coefficient(O) | 3.438E-06 | 7.299E-06 | 2.207E-06 | 1.683E-06 | -1.723E-06 | -2.454E-06 | -2.333E-04 |
| 30th coefficient(P) | -1.163E-05 | -9.039E-06 | -1.438E-06 | -2.792E-07 | 4.077E-07 | 4.547E-07 | -8.908E-05 |

|  | S8 | S9 | S10 | S11 | S12 | S13 | S14 |
|---|---|---|---|---|---|---|---|
| Conic constant(K) | 63.979 | -3.234 | 4.179 | 2.305 | 42.064 | 2.771 | -11.092 |
| 4th coefficient(A) | -3.172E-01 | -9.796E-01 | -1.629E+00 | -2.336E+00 | -8.742E-01 | -1.674E+00 | -3.889E+00 |
| 6th coefficient(B) | 3.010E-02 | 1.851E-02 | 2.694E-01 | 1.967E-01 | 5.217E-03 | 1.190E+00 | 1.024E+00 |
| 8th coefficient(C) | 1.015E-02 | 5.175E-02 | 3.910E-02 | 9.629E-02 | 5.652E-02 | -6.181E-01 | -2.073E-01 |
| 10th coefficient(D) | -1.679E-04 | 4.086E-02 | 8.451E-03 | -1.402E-02 | -8.435E-03 | 2.779E-01 | 1.129E-01 |
| 12th coefficient(E) | -3.776E-03 | 2.650E-05 | -1.668E-02 | -2.051E-02 | 1.660E-02 | -1.137E-01 | -7.562E-02 |
| 14th coefficient(F) | -1.980E-03 | -7.366E-03 | 4.564E-03 | -7.168E-03 | -2.451E-03 | 3.738E-02 | 1.769E-02 |
| 16th coefficient(G) | -5.668E-04 | -4.669E-03 | 6.296E-04 | 5.130E-03 | 1.251E-03 | -1.834E-03 | -1.575E-02 |
| 18th coefficient(H) | 2.498E-04 | -8.325E-04 | -6.500E-03 | 2.281E-03 | 4.205E-04 | 3.162E-03 | 1.159E-02 |
| 20th coefficient(J) | 2.898E-04 | 5.611E-04 | -5.754E-03 | -1.588E-03 | -1.550E-03 | -1.208E-03 | -5.706E-03 |
| 22nd coefficient(L) | 1.399E-04 | 5.774E-04 | -6.253E-04 | -5.771E-04 | -8.926E-05 | 6.540E-03 | 2.898E-03 |
| 24th coefficient(M) | -1.441E-05 | 2.717E-04 | 1.535E-03 | 1.092E-04 | -2.255E-04 | -4.173E-03 | -2.715E-03 |
| 26th coefficient(N) | -5.552E-05 | 1.081E-04 | 9.870E-04 | 1.873E-04 | 5.470E-05 | 2.404E-03 | 1.007E-03 |
| 28th coefficient(O) | -4.020E-05 | -1.637E-05 | 4.051E-05 | -5.598E-07 | 4.603E-05 | -1.187E-03 | -1.058E-04 |
| 30th coefficient(P) | -9.723E-06 | -3.695E-05 | -6.652E-05 | -4.071E-05 | 9.201E-06 | -3.349E-05 | 6.582E-04 |

Figure 6:
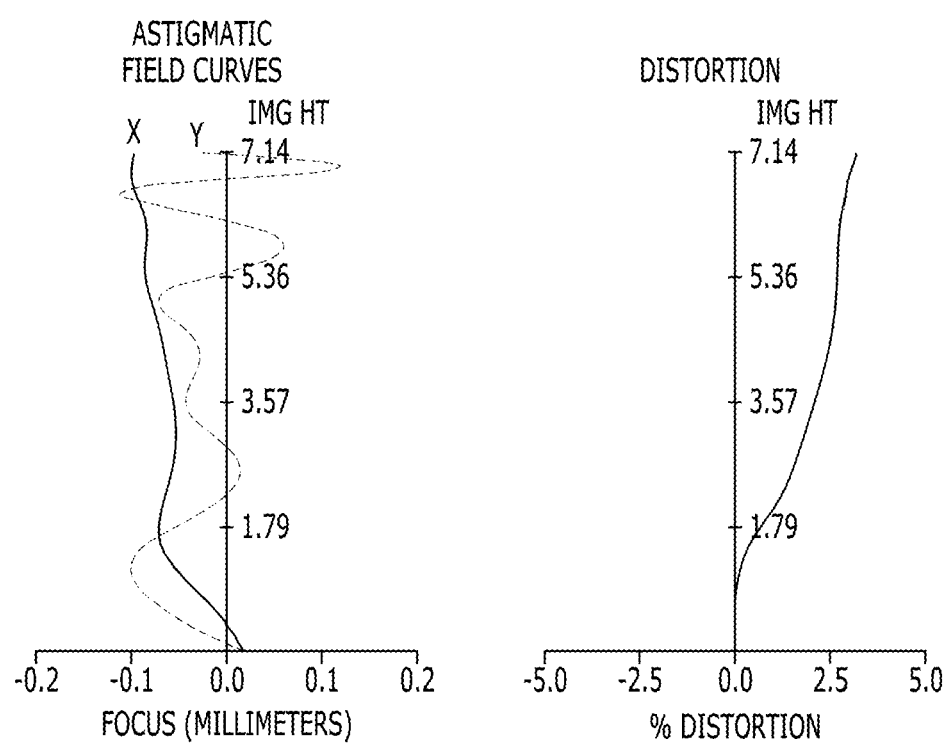
FIG. 6 is curves indicating aberration properties of the optical imaging system illustrated in FIG. 5.

Also, the optical imaging system configured as described above may have the aberration characteristics illustrated in FIG. 6.

Figure 7:
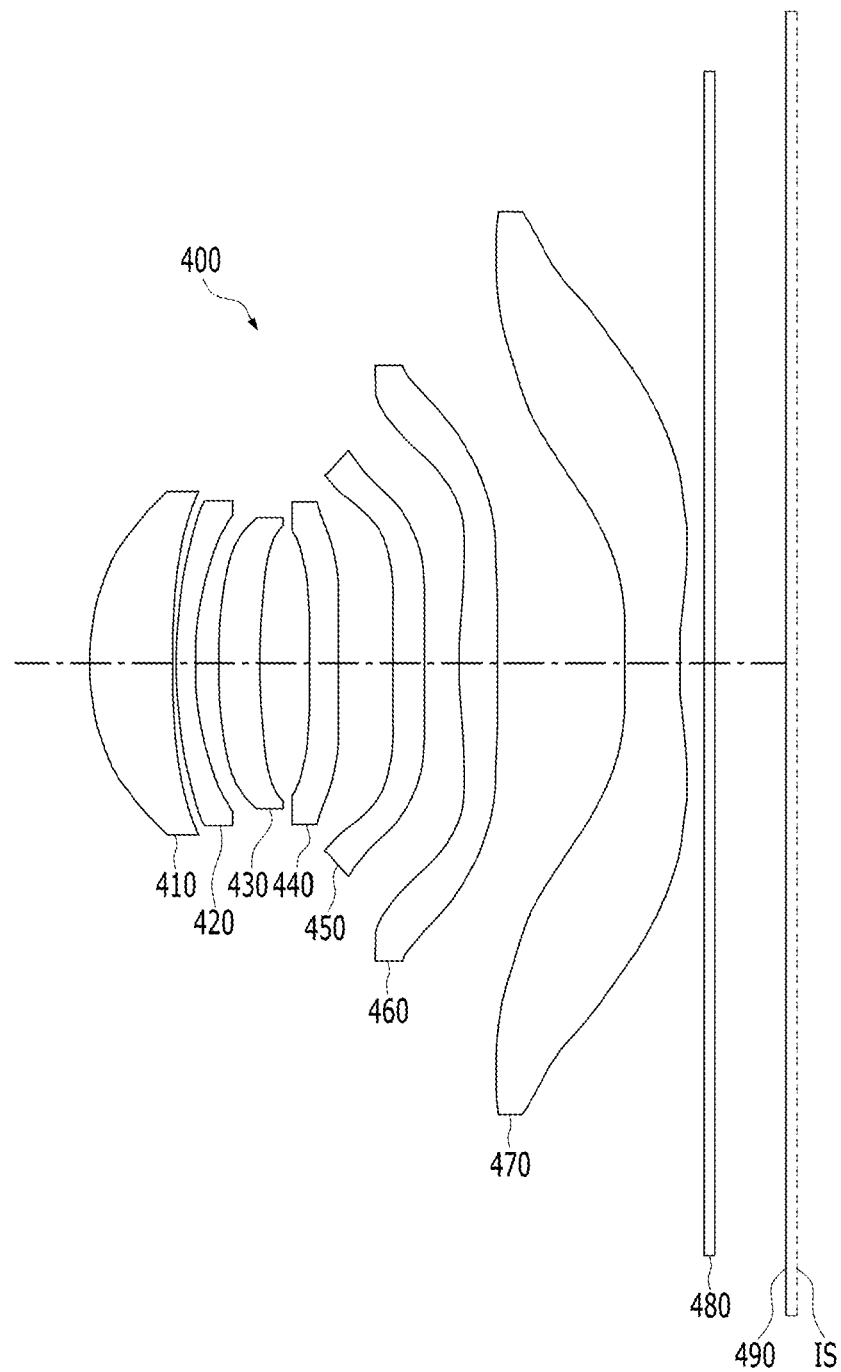
FIG. 7 is a diagram illustrating an optical imaging system according to a fourth example embodiment, according to one or more embodiments.

An optical imaging system 400, according to a fourth example embodiment, will be described with reference to FIGS. 7 and 8.

The optical imaging system 400 in the fourth example embodiment may include an optical system including a first lens 410, a second lens 420, a third lens 430, a fourth lens 440, a fifth lens 450, a sixth lens 460, and a seventh lens 470, and may further include a filter 480 and an image sensor IS.

The optical imaging system 400 in the fourth example embodiment may form a focus on the imaging plane 490. The imaging plane 490 may refer to a surface on which the optical imaging system may form a focus. For example, the imaging plane 490 may refer to one surface of the image sensor IS on which light is received.

The lens characteristics of each lens (a radius of curvature, a thickness of the lens or a distance between the lenses, a refractive index, an Abbe number, and a focal length) are listed in Table 7.

TABLE 7

| Surface No. | Note | Radius of curvature | Thickness or distance | Refractive index | Abbe number | Focal length |
|---|---|---|---|---|---|---|
| S1 | First lens | 2.642 | 0.874 | 1.544 | 56.1 | 6.463924 |
| S2 |  | 9.089 | 0.050 |  |  |  |
| S3 | Second lens | 4.949 | 0.240 | 1.680 | 18.4 | -15.3395 |
| S4 |  | 3.284 | 0.224 |  |  |  |
| S5 | Third lens | 6.409 | 0.518 | 1.535 | 56.1 | 23.07 |
| S6 |  | 14.083 | 0.537 |  |  |  |
| S7 | Fourth lens | -39.761 | 0.309 | 1.680 | 18.4 | -97.78 |
| S8 |  | -212.639 | 0.643 |  |  |  |
| S9 | Fifth lens | 20.106 | 0.340 | 1.614 | 25.9 | -27.446 |
| S10 |  | 9.202 | 0.404 |  |  |  |
| S11 | Sixth lens | 5.972 | 0.413 | 1.567 | 38.0 | 9.766 |
| S12 |  | -44.144 | 1.504 |  |  |  |
| S13 | Seventh lens | -22.213 | 0.562 | 1.535 | 56.1 | -5.573 |
| S14 |  | 3.399 | 0.300 |  |  |  |
| S15 | Filter | Infinity | 0.110 | 1.518 | 64.2 |  |
| S16 |  | Infinity | 0.738 |  |  |  |
| S17 | Imaging plane | Infinity |  |  |  |  |

The total focal length f of the optical imaging system 400 in the fourth example embodiment may be 7.48 mm, the IMG HT may be 7.145 mm, and the FOV may be 85.5°.

In the fourth example embodiment, the first lens 410 may have positive refractive power, the first surface of the first lens 410 may be convex, and the second surface of the first lens 410 may be concave.

The second lens 420 may have negative refractive power, a first surface of the second lens 420 may be convex, and a second surface of the second lens 420 may be concave.

The third lens 430 may have positive refractive power, a first surface of the third lens 430 may be convex, and a second surface of the third lens 430 may be concave.

The fourth lens 440 may have negative refractive power, a first surface of the fourth lens 440 may be concave, and a second surface of the fourth lens 440 may be convex.

The fifth lens 450 may have negative refractive power, the first surface of the fifth lens 450 may be convex in the paraxial region, and the second surface of the fifth lens 450 may be concave in the paraxial region.

Also, at least one inflection point may be formed on at least one of the first and second surfaces of the fifth lens 450. For example, the first surface of the fifth lens 450 may be convex in the paraxial region and may be concave in a portion other than the paraxial region. The second surface of the fifth lens 450 may be concave in the paraxial region and may be convex in a portion other than the paraxial region.

The sixth lens 460 may have positive refractive power, and the first and second surfaces of the sixth lens 460 may be convex in the paraxial region.

Also, at least one inflection point may be formed on at least one of the first and second surfaces of the sixth lens 460. For example, the first surface of the sixth lens 460 may be convex in the paraxial region and may be concave in a portion other than the paraxial region. Also, the second surface of the sixth lens 460 may be convex in the paraxial region and may be concave in a portion other than the paraxial region.

The seventh lens 470 may have negative refractive power, and the first and second surfaces of the seventh lens 470 may be concave in the paraxial region.

Also, at least one inflection point may be formed on at least one of the first and second surfaces of the seventh lens 470. For example, the first surface of the seventh lens 470 may be concave in the paraxial region and may be convex in a portion other than the paraxial region. The second surface of the seventh lens 470 may be concave in the paraxial region and may be convex in a portion other than the paraxial region.

Each surface of the first lens 410 to the seventh lens 470 may have an aspherical coefficient as in Table 8. For example, both the object-side surface and the image-side surface of the first lens 410 to the seventh lens 470 may be aspherical.

TABLE 8

|  | S1 | S2 | S3 | S4 | S5 | S6 | S7 |
|---|---|---|---|---|---|---|---|
| Conic constant(K) | −0.962 | 21.265 | −23.637 | −5.768 | 5.256 | 34.485 | 99.000 |
| 4th coefficient(A) | 1.189E−01 | −2.131E−02 | 4.042E−02 | 2.467E−02 | 7.593E−02 | 7.790E−02 | −2.032E−01 |
| 6th coefficient(B) | −1.715E−03 | −1.355E−02 | 4.662E−03 | 1.039E−02 | 2.104E−02 | 1.832E−02 | −1.273E−02 |
| 8th coefficient(C) | −3.566E−03 | −8.962E−03 | −1.480E−03 | −2.394E−03 | 9.759E−04 | 2.759E−03 | −8.837E−03 |
| 10th coefficient(D) | −3.020E−03 | −2.618E−03 | 8.852E−04 | 6.600E−05 | 1.767E−06 | 1.332E−04 | −8.868E−03 |
| 12th coefficient(E) | −1.231E−03 | −1.605E−03 | −3.764E−04 | 1.913E−04 | −1.542E−04 | −6.314E−05 | −7.636E−03 |
| 14th coefficient(F) | −6.617E−04 | 4.362E−06 | 3.834E−04 | 2.479E−04 | 1.015E−04 | −7.269E−05 | −6.405E−03 |
| 16th coefficient(G) | −7.249E−05 | −6.51 5E−05 | −5.578E−06 | 3.500E−05 | −2.024E−05 | −2.429E−05 | −4.807E−03 |
| 18th coefficient(H) | −5.633E−05 | −4.611E−05 | 7.220E−06 | −4.029E−05 | 1.487E−05 | −2.605E−05 | −3.648E−03 |
| 20th coefficient(J) | 5.163E−05 | −3.245E−05 | −1.432E−05 | 4.817E−06 | −2.220E−05 | −4.516E−06 | −2.486E−03 |
| 22nd coefficient(L) | −2.385E−05 | −2.938E−05 | 3.690E−06 | −3.075E−06 | 1.772E−05 | −5.386E−07 | −1.711E−03 |
| 24th coefficient(M) | 1.544E−05 | −3.689E−06 | −2.355E−06 | 2.589E−06 | −4.217E−06 | −1.857E−06 | −1.018E−03 |
| 26th coefficient(N) | −2.058E−05 | −1.246E−05 | −2.120E−06 | −5.189E−06 | 1.841E−06 | −2.089E−06 | −5.987E−04 |
| 28th coefficient(O) | 1.132E−05 | 1.040E−05 | 2.284E−06 | 1.756E−06 | −1.745E−06 | −1.441E−06 | −2.794E−04 |
| 30th coefficient(P) | −1.036E−05 | −1.153E−05 | −1.302E−06 | −1.020E−07 | 4.008E−07 | −7.907E−08 | −1.196E−04 |

|  | S8 | S9 | S10 | S11 | S12 | S13 | S14 |
|---|---|---|---|---|---|---|---|
| Conic constant(K) | 99.000 | −9.626 | 3.971 | 2.309 | 99.000 | 0.747 | −12.041 |
| 4th coefficient(A) | −3.203E−01 | −9.829E−01 | −1.635E+00 | −2.343E+00 | −9.147E−01 | −1.649E+00 | −3.822E+00 |
| 6th coefficient(B) | 2.994E−02 | 1.620E−02 | 2.738E−01 | 2.046E−01 | −7.286E−03 | 1.184E+00 | 1.019E+00 |
| 8th coefficient(C) | 1.104E−02 | 5.423E−02 | 4.038E−02 | 9.506E−02 | 5.627E−02 | −6.201E−01 | −2.150E−01 |
| 10th coefficient(D) | −8.390E−04 | 4.117E−02 | 5.882E−03 | −1.346E−02 | −6.920E−03 | 2.764E−01 | 1.034E−01 |

TABLE 8-continued

| 12th coefficient(E) | −4.176E−03 | 4.560E−04 | −1.693E−02 | −2.061E−02 | 1.636E−02 | −1.081E−01 | −7.551E−02 |
| --- | --- | --- | --- | --- | --- | --- | --- |
| 14th coefficient(F) | −2.168E−03 | −7.416E−03 | 5.451E−03 | −7.080E−03 | −1.717E−03 | 3.845E−02 | 2.676E−02 |
| 16th coefficient(G) | −2.297E−04 | −4.701E−03 | 9.516E−04 | 4.781E−03 | 1.014E−03 | −5.494E−03 | −1.769E−02 |
| 18th coefficient(H) | 5.827E−04 | −7.707E−04 | −6.858E−03 | 2.631E−03 | 4.903E−04 | 7.122E−03 | 1.295E−02 |
| 20th coefficient(J) | 5.169E−04 | 5.599E−04 | −6.371E−03 | −1.687E−03 | −1.747E−03 | −4.322E−03 | −8.190E−03 |
| 22nd coefficient(L) | 1.433E−04 | 5.293E−04 | −6.302E−04 | −5.809E−04 | −7.31lE−05 | 7.360E−03 | 3.688E−03 |
| 24th coefficient(M) | −8.609E−05 | 1.993E−04 | 1.821E−03 | 6.918E−05 | −2.277E−04 | −5.427E−03 | −2.723E−03 |
| 26th coefficient(N) | −1.604E−04 | 7.439E−05 | 1.254E−03 | 2.024E−04 | 4.714E−05 | 2.311E−03 | 9.106E−04 |
| 28th coefficient(O) | −9.767E−05 | −2.613E−05 | 1.001E−04 | −2.274E−05 | 3.713E−05 | −1.808E−03 | −3.738E−04 |
| 30th coefficient(P) | −3.819E−05 | −3.885E−05 | −6.278E−05 | −3.698E−05 | 2.919E−05 | 2.691E−05 | 7.381E−04 |

Figure 8:
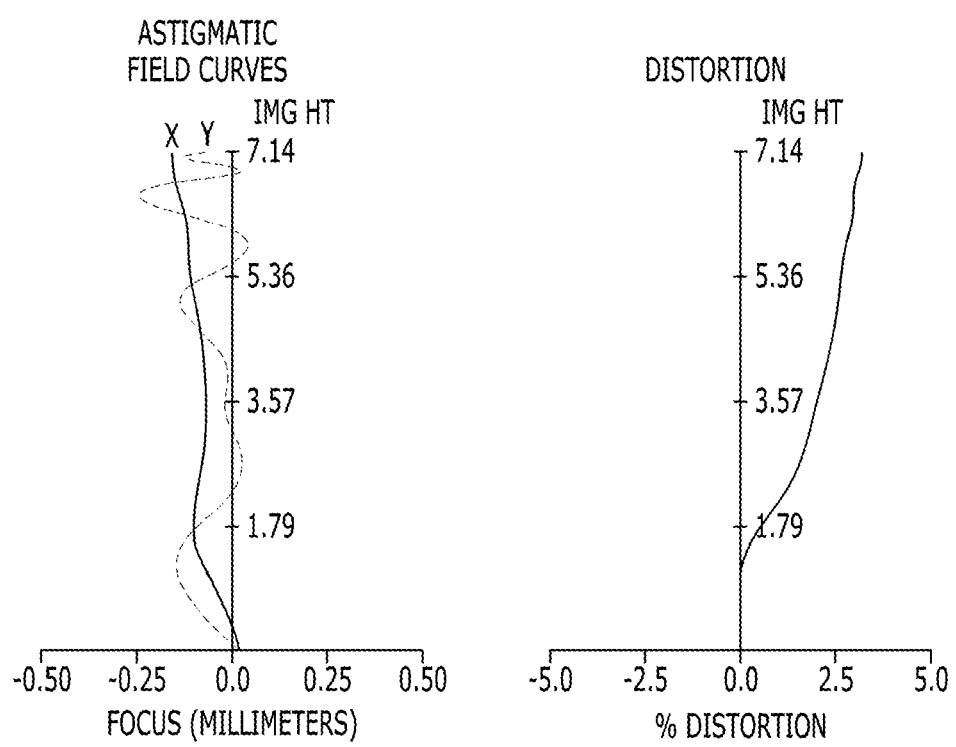
FIG. 8 is curves indicating aberration properties of the optical imaging system illustrated in FIG. 7.

Also, the optical imaging system configured as described above may have the aberration characteristics illustrated in FIG. 8.

Figure 9:
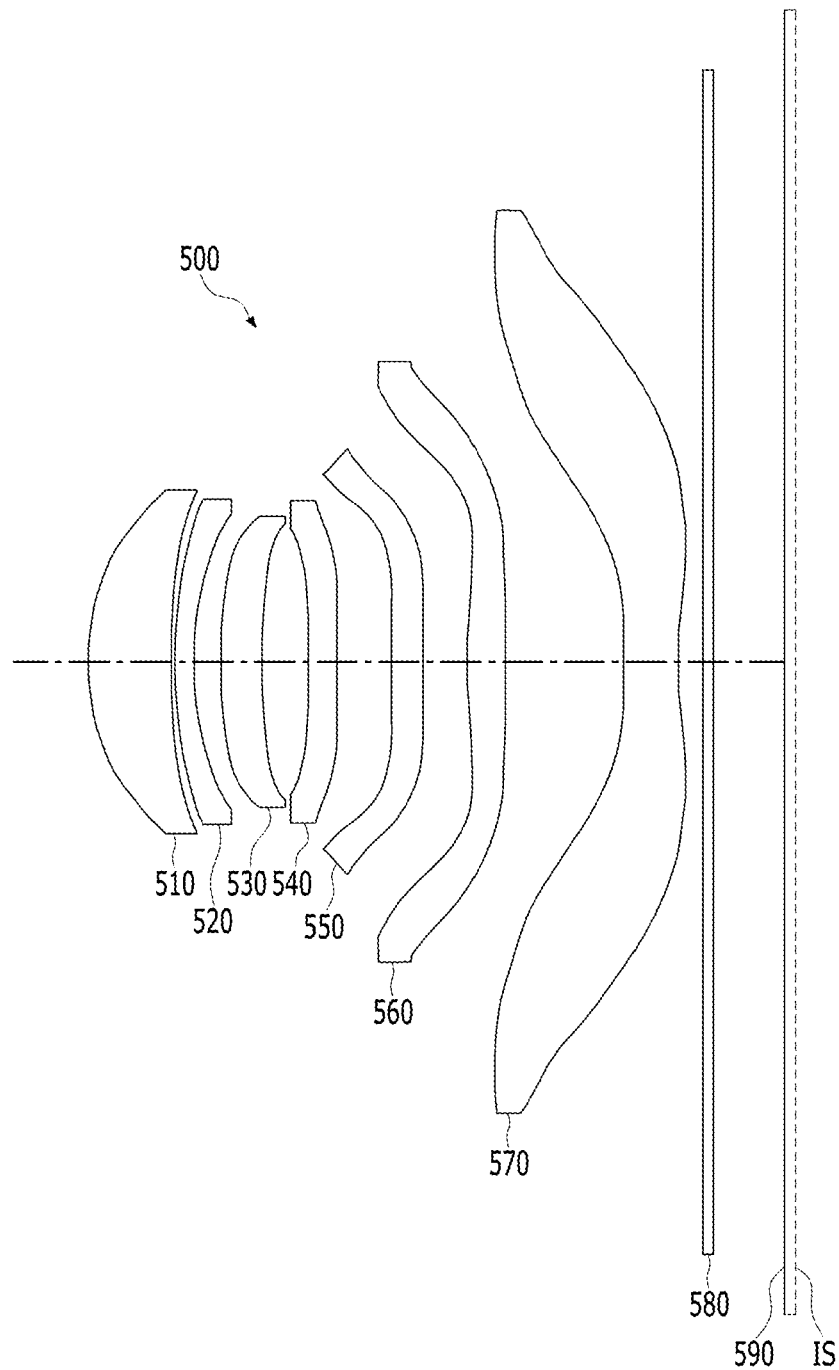
FIG. 9 is a diagram illustrating an optical imaging system according to a fifth example embodiment, according to one or more embodiments.

An optical imaging system 500, according to a fifth example embodiment, will be described with reference to FIGS. 9 and 10.

The optical imaging system 500 in the fifth example embodiment may include an optical system including a first lens 510, a second lens 520, a third lens 530, a fourth lens 540, and a fifth lens 550, a sixth lens 560, and a seventh lens 570, and may further include a filter 580 and an image sensor IS.

The optical imaging system 500 in the fifth example embodiment may form a focus on the imaging plane 590. The imaging plane 590 may refer to a surface on which the optical imaging system may form a focus. For example, the imaging plane 590 may refer to one surface of the image sensor IS on which light is received.

The lens characteristics of each lens (a radius of curvature, a thickness of the lens or a distance between the lenses, a refractive index, an Abbe number, and a focal length) are listed in Table 9.

The total focal length f of the optical imaging system 500 in the fifth example embodiment may be 7.48 mm, the IMG HT may be 7.145 mm, and the FOV may be 85.3°.

In the fifth example embodiment, the first lens 510 may have positive refractive power, the first surface of the first lens 510 may be convex, and the second surface of the first lens 510 may be concave.

The second lens 520 may have negative refractive power, a first surface of the second lens 520 may be convex, and a second surface of the second lens 520 may be concave.

The third lens 530 may have positive refractive power, a first surface of the third lens 530 may be convex, and a second surface of the third lens 530 may be concave.

The fourth lens 540 may have negative refractive power, and first and second surfaces of the fourth lens 540 may be concave.

The fifth lens 550 may have negative refractive power, the first surface of the fifth lens 550 may be convex in the paraxial region, and the second surface of the fifth lens 550 may be concave in the paraxial region.

Also, at least one inflection point may be formed on at least one of the first and second surfaces of the fifth lens 550.

TABLE 9

| Surface No. | Note | Radius of curvature | Thickness or distance | Refractive index | Abbe number | Focal length |
| --- | --- | --- | --- | --- | --- | --- |
| S1 | First lens | 2.638 | 0.868 | 1.544 | 56.1 | 6.463924 |
| S2 | | 9.064 | 0.025 | | | |
| S3 | Second lens | 4.845 | 0.237 | 1.680 | 18.4 | −15.3395 |
| S4 | | 3.342 | 0.250 | | | |
| S5 | Third lens | 6.364 | 0.527 | 1.535 | 56.1 | 23.07 |
| S6 | | 12.270 | 0.529 | | | |
| S7 | Fourth lens | −73.360 | 0.307 | 1.680 | 18.4 | −97.78 |
| S8 | | 107.250 | 0.634 | | | |
| S9 | Fifth lens | 21.865 | 0.340 | 1.614 | 25.9 | −27.446 |
| S10 | | 9.712 | 0.467 | | | |
| S11 | Sixth lens | 6.002 | 0.450 | 1.567 | 38.0 | 9.766 |
| S12 | | −45.629 | 1.382 | | | |
| S13 | Seventh lens | −22.784 | 0.544 | 1.535 | 56.1 | −5.573 |
| S14 | | 3.482 | 0.300 | | | |
| S15 | Filter | Infinity | 0.110 | 1.518 | 64.2 | |
| S16 | | Infinity | 0.795 | | | |
| S17 | Imaging plane | Infinity | | | | |

For example, the first surface of the fifth lens 550 may be convex in the paraxial region and may be concave in a portion other than the paraxial region. The second surface of the fifth lens 550 may be concave in the paraxial region and may be convex in a portion other than the paraxial region.

The sixth lens 560 may have positive refractive power, and the first and second surfaces of the sixth lens 560 may be convex in the paraxial region.

Also, at least one inflection point may be formed on at least one of the first and second surfaces of the sixth lens 560. For example, the first surface of the sixth lens 560 may be convex in the paraxial region and may be concave in a portion other than the paraxial region. The second surface of the sixth lens 560 may be convex in the paraxial region and may be concave in a portion other than the paraxial region.

The seventh lens 570 may have negative refractive power, and the first and second surfaces of the seventh lens 570 may be concave in the paraxial region.

Also, at least one inflection point may be formed on at least one of the first and second surfaces of the seventh lens 570. For example, the first surface of the seventh lens 570 may be concave in the paraxial region and may be convex in a portion other than the paraxial region. The second surface of the seventh lens 570 may be concave in the paraxial region and may be convex in a portion other than the paraxial region.

Each surface of the first lens 510 to the seventh lens 570 may have an aspherical coefficient as in Table 10. For example, both the object-side surface and the image-side surface of the first lens 510 to the seventh lens 570 may be aspherical.

TABLE 10

| | S1 | S2 | S3 | S4 | S5 | S6 | S7 |
|---|---|---|---|---|---|---|---|
| Conic constant(K) | −0.924 | 21.123 | −23.723 | −5.723 | 4.878 | 25.981 | 99.000 |
| 4th coefficient(A) | 1.227E−01 | −2.079E−02 | 3.983E−02 | 2.559E−02 | 7.404E−02 | 7.402E−02 | −2.063E−01 |
| 6th coefficient(B) | −6.040E−03 | −1.502E−02 | 7.903E−03 | 1.068E−02 | 2.184E−02 | 1.958E−02 | −1.763E−02 |
| 8th coefficient(C) | −1.339E−03 | −7.403E−03 | −2.798E−03 | −2.975E−03 | 8.331E−04 | 2.813E−03 | −7.784E−03 |
| 10th coefficient(D) | −2.941E−03 | −2.264E−03 | 1.761E−03 | −2.201E−04 | 4.477E−05 | 1.650E−04 | −9.129E−03 |
| 12th coefficient(E) | −3.148E−04 | −1.542E−03 | −8.937E−04 | 8.937E−05 | −1.103E−04 | −1.168E−04 | −7.063E−03 |
| 14th coefficient(F) | −7.361E−04 | −1.287E−04 | 4.833E−04 | 6.411E−05 | 9.306E−05 | −1.062E−04 | −6.430E−03 |
| 16th coefficient(G) | 1.363E−04 | 3.515E−05 | −9.487E−05 | 8.939E−05 | −2.948E−05 | −4.618E−05 | −4.632E−03 |
| 18th coefficient(H) | −1.904E−04 | −1.282E−04 | 4.298E−05 | −6.712E−05 | 1.065E−05 | −3.157E−05 | −3.751E−03 |
| 20th coefficient(J) | 1.394E−04 | 9.439E−05 | 7.610E−06 | 4.163E−05 | −2.389E−05 | −9.749E−06 | −2.491E−03 |
| 22nd coefficient(L) | −9.103E−05 | −1.208E−04 | −5.235E−06 | −2.106E−05 | 1.782E−05 | −1.249E−05 | −1.819E−03 |
| 24th coefficient(M) | 8.401E−05 | 5.762E−05 | 7.491E−06 | 1.976E−05 | −3.663E−06 | −2.540E−06 | −1.053E−03 |
| 26th coefficient(N) | −5.597E−05 | −5.774E−05 | −4.723E−06 | −1.554E−05 | 2.147E−06 | −1.580E−05 | −6.718E−04 |
| 28th coefficient(O) | 4.181E−05 | 5.189E−05 | −1.913E−07 | 4.501E−06 | −1.739E−06 | 9.670E−06 | −2.934E−04 |
| 30th coefficient(P) | −1.928E−05 | −2.884E−05 | −4.715E−07 | −4.168E−07 | 3.451E−07 | −2.959E−06 | −1.569E−04 |

| | S8 | S9 | S10 | S11 | S12 | S13 | S14 |
|---|---|---|---|---|---|---|---|
| Conic constant(K) | −99.000 | 2.883 | 4.621 | 2.323 | 99.000 | −2.750 | −14.643 |
| 4th coefficient(A) | −3.377E−01 | −9.787E−01 | −1.627E+00 | −2.346E+00 | −9.826E−01 | −1.657E+00 | −3.675E+00 |
| 6th coefficient(B) | 2.315E−02 | 2.116E−02 | 2.723E−01 | 2.069E−01 | 3.276E−02 | 1.184E+00 | 1.018E+00 |
| 8th coefficient(C) | 1.215E−02 | 5.473E−02 | 3.403E−02 | 9.696E−02 | 4.848E−02 | −6.293E−01 | −2.272E−01 |
| 10th coefficient(D) | −6.473E−04 | 4.028E−02 | 6.959E−03 | −7.692E−03 | −7.880E−03 | 2.868E−01 | 9.687E−02 |
| 12th coefficient(E) | −3.795E−03 | −4.400E−04 | −1.564E−02 | −2.154E−02 | 1.584E−02 | −1.112E−01 | −6.542E−02 |
| 14th coefficient(F) | −2.420E−03 | −8.231E−03 | 6.009E−03 | −9.576E−03 | −1.855E−03 | 3.054E−02 | 2.328E−02 |
| 16th coefficient(G) | −2.887E−04 | −4.904E−03 | 2.553E−04 | 4.937E−03 | 9.783E−04 | −2.020E−03 | −1.610E−02 |
| 18th coefficient(H) | 5.142E−04 | −9.033E−04 | −6.850E−03 | 2.710E−03 | 2.613E−04 | 3.862E−03 | 9.275E−03 |
| 20th coefficient(J) | 6.807E−04 | 7.985E−04 | −5.466E−03 | −1.192E−03 | −1.128E−03 | −4.410E−03 | −5.493E−03 |
| 22nd coefficient(L) | 2.643E−04 | 7.260E−04 | −4.289E−04 | −6.845E−04 | −8.831E−05 | 7.297E−03 | 3.043E−03 |
| 24th coefficient(M) | 4.010E−05 | 3.723E−04 | 1.198E−03 | −4.552E−05 | −1.924E−04 | −4.470E−03 | −1.933E−03 |

TABLE 10-continued

| | | | | | | | |
|---|---|---|---|---|---|---|---|
| 26th coefficient(N) | −1.176E−04 | 1.976E−05 | 4.998E−04 | 1.432E−04 | 1.556E−05 | 2.037E−03 | 1.034E−03 |
| 28th coefficient(O) | −7.331E−05 | −6.880E−05 | −2.020E−04 | 7.928E−06 | 4.726E−05 | −8.894E−04 | 1.065E−04 |
| 30th coefficient(P) | −4.070E−05 | −8.085E−05 | −1.334E−04 | −3.814E−05 | 8.166E−06 | −9.818E−05 | 5.701E−04 |

Figure 10:
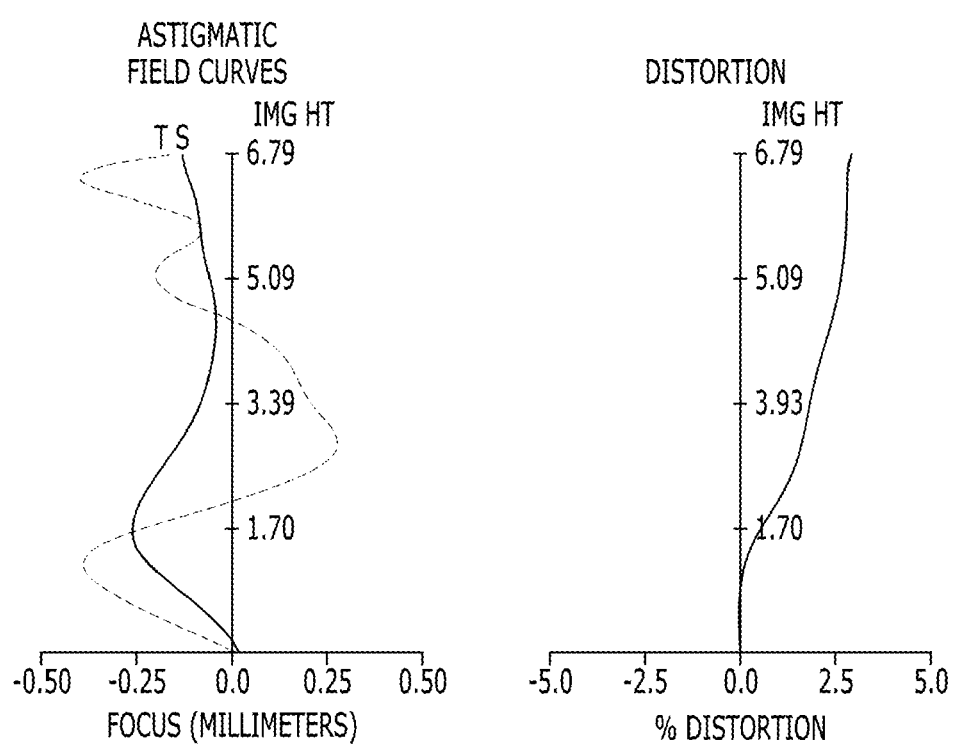
FIG. 10 is curves indicating aberration properties of the optical imaging system illustrated in FIG. 9.

Also, the optical imaging system configured as described above may have the aberration characteristics illustrated in FIG. 10.

Figure 11:
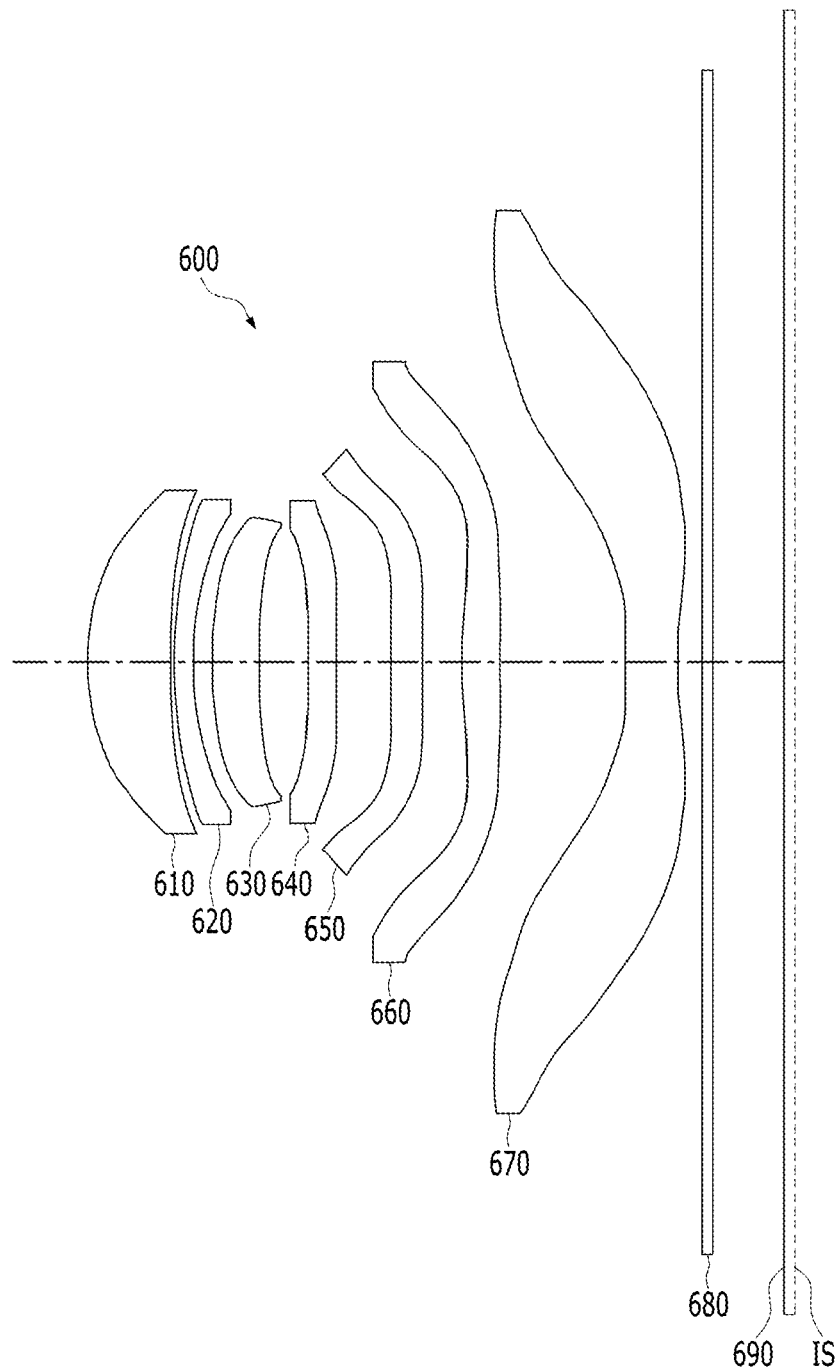
FIG. 11 is a diagram illustrating an optical imaging system according to a sixth example embodiment, according to one or more embodiments.

An optical imaging system 600, according to a sixth example embodiment, will be described with reference to FIGS. 11 and 12.

The optical imaging system 600 in the sixth example embodiment may include an optical system including a first lens 610, a second lens 620, a third lens 630, a fourth lens 640, and a fifth lens 650, a sixth lens 660, and a seventh lens 670, and may further include a filter 680 and an image sensor IS.

The optical imaging system 600 in the sixth example embodiment may form a focus on the imaging plane 690. The imaging plane 690 may refer to a surface on which the optical imaging system may form a focus. For example, the imaging plane 690 may refer to one surface of the image sensor IS on which light is received.

The lens characteristics of each lens (a radius of curvature, a thickness of the lens or a distance between the lenses, a refractive index, an Abbe number, and a focal length) are listed in Table 11.

The fifth lens 650 may have negative refractive power, the first surface of the fifth lens 650 may be convex in the paraxial region, and the second surface of the fifth lens 650 may be concave in the paraxial region.

Also, at least one inflection point may be formed on at least one of the first and second surfaces of the fifth lens 650. For example, the first surface of the fifth lens 650 may be convex in the paraxial region and may be concave in a portion other than the paraxial region. The second surface of the fifth lens 650 may be concave in the paraxial region and may be convex in a portion other than the paraxial region.

The sixth lens 660 may have positive refractive power, and the first and second surfaces of the sixth lens 660 may be convex in the paraxial region.

Also, at least one inflection point may be formed on at least one of the first and second surfaces of the sixth lens 660. For example, the first surface of the sixth lens 660 may be convex in the paraxial region and may be concave in a portion other than the paraxial region. The second surface of the sixth lens 660 may be convex in the paraxial region and may be concave in a portion other than the paraxial region.

TABLE 11

| Surface No. | Note | Radius of curvature | Thickness or distance | Refractive index | Abbe number | Focal length |
|---|---|---|---|---|---|---|
| S1 | First lens | 2.636 | 0.891 | 1.544 | 56.1 | 6.463924 |
| S2 | | 9.051 | 0.025 | | | |
| S3 | Second lens | 4.780 | 0.216 | 1.680 | 18.4 | −15.3395 |
| S4 | | 3.331 | 0.254 | | | |
| S5 | Third lens | 6.437 | 0.530 | 1.535 | 56.1 | 23.07 |
| S6 | | 12.010 | 0.529 | | | |
| S7 | Fourth lens | −144.579 | 0.303 | 1.680 | 18.4 | −97.78 |
| S8 | | 58.788 | 0.639 | | | |
| S9 | Fifth lens | 23.967 | 0.340 | 1.614 | 25.9 | −27.446 |
| S10 | | 10.355 | 0.467 | | | |
| S11 | Sixth lens | 6.016 | 0.450 | 1.567 | 38.0 | 9.766 |
| S12 | | −51.732 | 1.427 | | | |
| S13 | Seventh lens | −17.848 | 0.543 | 1.535 | 56.1 | −5.573 |
| S14 | | 3.584 | 0.300 | | | |
| S15 | Filter | Infinity | 0.110 | 1.518 | 64.2 | |
| S16 | | Infinity | 0.761 | | | |
| S17 | Imaging plane | Infinity | | | | |

The total focal length f of the optical imaging system 600 in the sixth example embodiment may be 7.48 mm, the IMG HT may be 7.145 mm, and the FOV may be 85°.

In the sixth example embodiment, the first lens 610 may have positive refractive power, the first surface of the first lens 610 may be convex, and the second surface of the first lens 610 may be concave.

The second lens 620 may have negative refractive power, a first surface of the second lens 620 may be convex, and a second surface of the second lens 620 may be concave.

The third lens 630 may have positive refractive power, a first surface of the third lens 630 may be convex, and a second surface of the third lens 630 may be concave.

The fourth lens 640 may have negative refractive power, and first and second surfaces of the fourth lens 640 may be concave.

The seventh lens 670 may have negative refractive power, and the first and second surfaces of the seventh lens 670 may be concave in the paraxial region.

Also, at least one inflection point may be formed on at least one of the first and second surfaces of the seventh lens 670. For example, the first surface of the seventh lens 670 may be concave in the paraxial region and may be convex in a portion other than the paraxial region. The second surface of the seventh lens 670 may be concave in the paraxial region and may be convex in a portion other than the paraxial region.

Each surface of the first lens 610 to the seventh lens 670 may have an aspherical coefficient as in Table 12. For example, both the object-side surface and the image-side surface of the first lens 610 to the seventh lens 670 may be aspherical.

TABLE 12

|  | S1 | S2 | S3 | S4 | S5 | S6 | S7 |
|---|---|---|---|---|---|---|---|
| Conic constant(K) | −0.907 | 21.100 | −24.104 | −5.754 | 4.991 | 23.293 | 99.000 |
| 4th coefficient(A) | 1.239E−01 | −2.024E−02 | 3.999E−02 | 2.564E−02 | 7.375E−02 | 7.276E−02 | −2.095E−01 |
| 6th coefficient(B) | −5.724E−03 | −1.509E−02 | 1.018E−02 | 1.291E−02 | 2.157E−02 | 1.934E−02 | −1.821E−02 |
| 8th coefficient(C) | −1.105E−03 | −7.667E−03 | −3.062E−03 | −2.786E−03 | 8.655E−04 | 2.617E−03 | −7.263E−03 |
| 10th coefficient(D) | −2.885E−03 | −2.186E−03 | 1.966E−03 | −1.626E−04 | 3.640E−05 | 2.080E−04 | −8.667E−03 |
| 12th coefficient(E) | −2.165E−04 | −1.561E−03 | −9.686E−04 | 6.383E−05 | −1.097E−04 | −1.358E−04 | −6.534E−03 |
| 14th coefficient(F) | −7.209E−04 | −8.695E−05 | 5.235E−04 | 4.794E−05 | 9.025E−05 | −8.083E−05 | −6.078E−03 |
| 16th coefficient(G) | 1.540E−04 | 5.339E−05 | −1.064E−04 | 9.796E−05 | −2.815E−05 | −5.649E−05 | −4.300E−03 |
| 18th coefficient(H) | −1.943E−04 | −1.164E−04 | 4.794E−05 | −7.420E−05 | 1.379E−05 | −2.643E−05 | −3.530E−03 |
| 20th coefficient(J) | 1.424E−04 | 1.140E−04 | 1.025E−05 | 4.712E−05 | −2.505E−05 | −1.394E−05 | −2.313E−03 |
| 22nd coefficient(L) | −9.737E−05 | −1.173E−04 | −1.869E−06 | −2.150E−05 | 1.766E−05 | −4.901E−06 | −1.715E−03 |
| 24th coefficient(M) | 7.769E−05 | 6.427E−05 | 7.803E−06 | 2.125E−05 | −3.638E−06 | −4.764E−06 | −9.830E−04 |
| 26th coefficient(N) | −6.208E−05 | −6.727E−05 | −4.052E−06 | −1.578E−05 | 2.142E−06 | −1.759E−05 | −6.397E−04 |
| 28th coefficient(O) | 4.406E−05 | 5.683E−05 | −1.763E−07 | 4.379E−06 | −1.761E−06 | 1.195E−05 | −2.809E−04 |
| 30th coefficient(P) | −1.269E−05 | −3.083E−05 | −6.983E−07 | −4.456E−07 | 3.555E−07 | −3.563E−06 | −1.528E−04 |

|  | S8 | S9 | S10 | S11 | S12 | S13 | S14 |
|---|---|---|---|---|---|---|---|
| Conic constant(K) | −98.918 | 20.903 | 7.146 | 2.349 | 99.000 | −11.865 | −18.024 |
| 4th coefficient(A) | −3.468E−01 | −9.754E−01 | −1.612E+00 | −2.347E+00 | −1.017E+00 | −1.629E+00 | −3.604E+00 |
| 6th coefficient(B) | 2.067E−02 | 2.139E−02 | 2.776E−01 | 2.177E−01 | 3.978E−02 | 1.183E+00 | 1.020E+00 |
| 8th coefficient(C) | 1.237E−02 | 5.518E−02 | 3.405E−02 | 9.760E−02 | 4.477E−02 | −6.371E−01 | −2.259E−01 |
| 10th coefficient(D) | 2.368E−04 | 4.002E−02 | 3.370E−03 | −4.607E−03 | −6.692E−03 | 2.875E−01 | 8.528E−02 |
| 12th coefficient(E) | −3.679E−03 | −9.956E−04 | −1.617E−02 | −2.279E−02 | 1.488E−02 | −1.087E−01 | −6.249E−02 |
| 14th coefficient(F) | −2.718E−03 | −8.293E−03 | 7.235E−03 | −1.035E−02 | −1.088E−03 | 2.838E−02 | 2.509E−02 |
| 16th coefficient(G) | −7.613E−04 | −4.690E−03 | 1.216E−03 | 4.595E−03 | 7.098E−04 | −2.743E−03 | −1.632E−02 |
| 18th coefficient(H) | 1.229E−04 | −6.465E−04 | −6.695E−03 | 3.349E−03 | 4.311E−04 | 4.894E−03 | 9.822E−03 |
| 20th coefficient(J) | 4.078E−04 | 8.016E−04 | −5.553E−03 | −9.193E−04 | −1.060E−03 | −5.888E−03 | −6.684E−03 |
| 22nd coefficient(L) | 1.188E−04 | 6.722E−04 | −8.176E−04 | −7.351E−04 | −8.463E−05 | 8.142E−03 | 3.774E−03 |
| 24th coefficient(M) | −4.075E−05 | 2.798E−04 | 5.063E−04 | −2.006E−04 | −1.725E−04 | −5.122E−03 | −1.888E−03 |
| 26th coefficient(N) | −1.556E−04 | 1.370E−05 | −2.004E−04 | 1.349E−04 | −4.106E−06 | 2.548E−03 | 1.162E−03 |
| 28th coefficient(O) | −9.469E−05 | −7.070E−05 | −6.009E−04 | 4.864E−05 | 4.876E−05 | −1.083E−03 | 1.112E−05 |
| 30th coefficient(P) | −4.633E−05 | −5.835E−05 | −2.539E−04 | −1.591E−05 | 8.869E−06 | 1.843E−05 |  |

Figure 12:
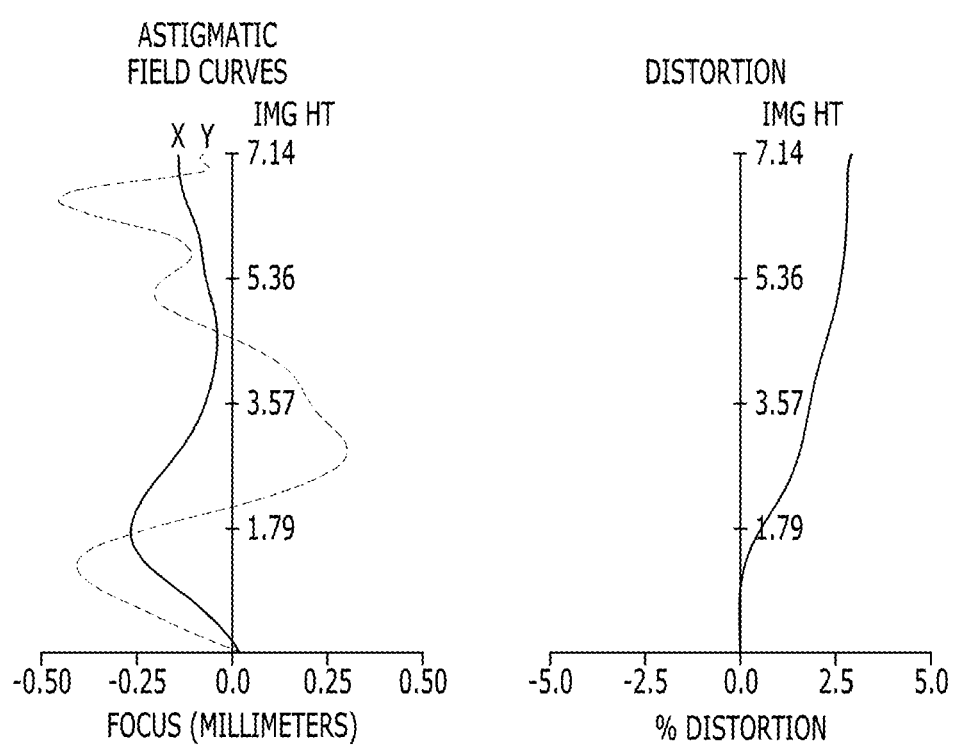
FIG. 12 is curves indicating aberration properties of the optical imaging system illustrated in FIG. 11.

Also, the optical imaging system configured as described above may have the aberration characteristics illustrated in FIG. 12.

Figure 13:
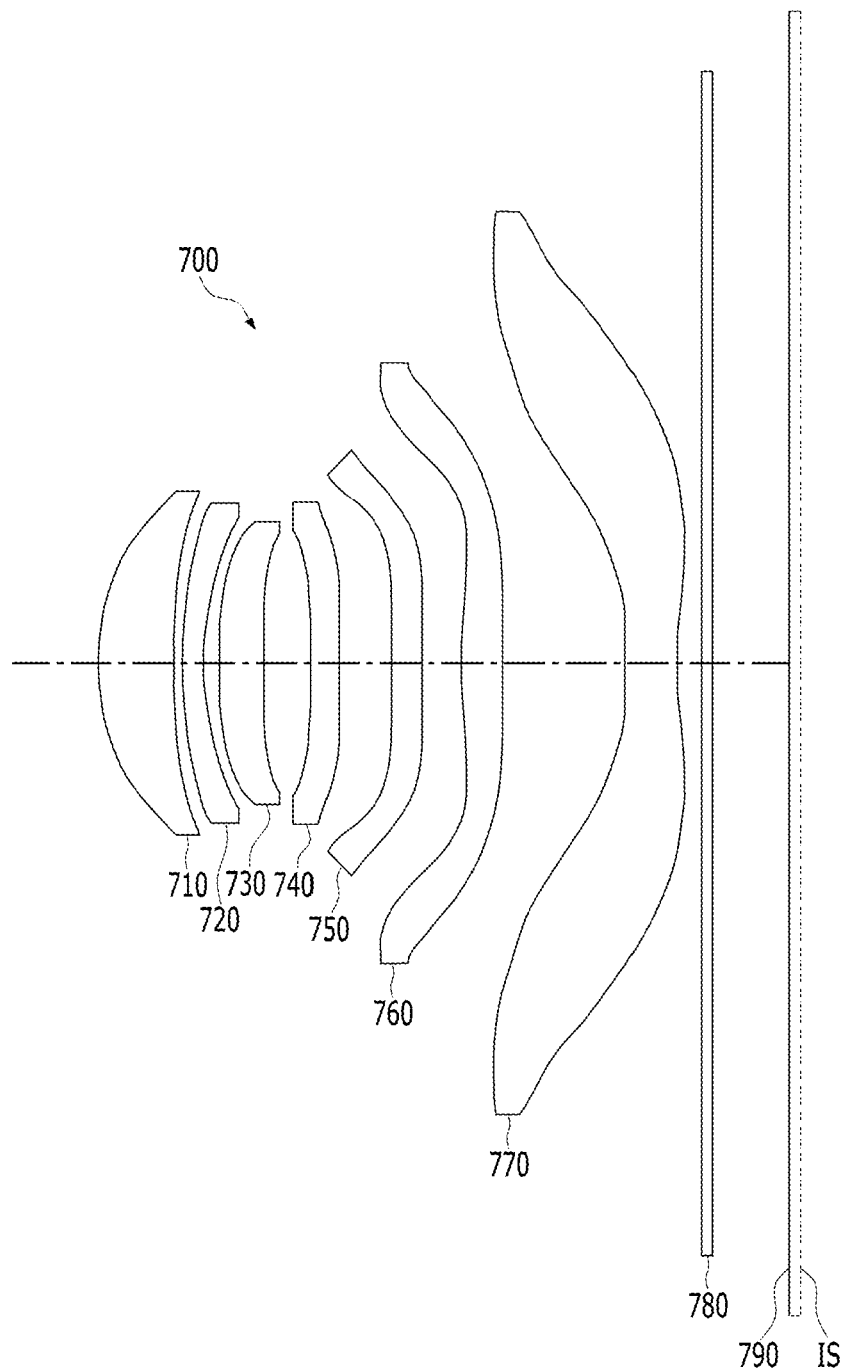
FIG. 13 is a diagram illustrating an optical imaging system according to a seventh example embodiment, according to one or more embodiments.

An optical imaging system 700 according to a seventh example embodiment will be described with reference to FIGS. 13 and 14.

The optical imaging system 700 in the seventh example embodiment may include an optical system including a first lens 710, a second lens 720, a third lens 730, a fourth lens 740, and a fifth lens 750, a sixth lens 760, and a seventh lens 770, and may further include a filter 780 and an image sensor IS.

The optical imaging system 700 in the seventh example embodiment may form a focus on the imaging plane 790. The imaging plane 790 may refer to a surface on which a focus may be formed by the optical imaging system. For example, the imaging plane 790 may refer to one surface of the image sensor IS on which light is received.

The lens characteristics of each lens (a radius of curvature, a thickness of the lens or a distance between the lenses, a refractive index, an Abbe number, and a focal length) are listed in Table 13.

TABLE 13

| Surface No. | Note | Radius of curvature | Thickness or distance | Refractive index | Abbe number | Focal length |
|---|---|---|---|---|---|---|
| S1 | First lens | 2.646 | 0.850 | 1.544 | 56.1 | 6.463924 |
| S2 | | 9.101 | 0.081 | | | |
| S3 | Second lens | 5.293 | 0.254 | 1.680 | 18.4 | −15.3395 |
| S4 | | 3.411 | 0.179 | | | |
| S5 | Third lens | 6.591 | 0.497 | 1.535 | 56.1 | 23.07 |
| S6 | | 15.526 | 0.524 | | | |
| S7 | Fourth lens | −64.595 | 0.338 | 1.680 | 18.4 | −97.78 |
| S8 | | 112.485 | 0.581 | | | |
| S9 | Fifth lens | 14.983 | 0.340 | 1.614 | 25.9 | −27.446 |
| S10 | | 8.173 | 0.443 | | | |
| S11 | Sixth lens | 5.944 | 0.474 | 1.567 | 38.0 | 9.766 |
| S12 | | −24.303 | 1.376 | | | |
| S13 | Seventh lens | −25.058 | 0.590 | 1.535 | 56.1 | −5.573 |
| S14 | | 3.471 | 0.300 | | | |
| S15 | Filter | Infinity | 0.110 | 1.518 | 64.2 | |
| S16 | | Infinity | 0.831 | | | |
| S17 | Imaging plane | Infinity | | | | |

The total focal length f of the optical imaging system 700 in the seventh example embodiment may be 7.48 mm, the IMG HT may be 7.145 mm, and the FOV may be 86.8°.

In the seventh example embodiment, the first lens 710 may have positive refractive power, the first surface of the first lens 710 may be convex, and the second surface of the first lens 710 may be concave.

The second lens 720 may have negative refractive power, a first surface of the second lens 720 may be convex, and a second surface of the second lens 720 may be concave.

The third lens 730 may have positive refractive power, a first surface of the third lens 730 may be convex, and a second surface of the third lens 730 may be concave.

The fourth lens 740 may have negative refractive power, and first and second surfaces of the fourth lens 740 may be concave.

The fifth lens 750 may have negative refractive power, the first surface of the fifth lens 750 may be convex in the paraxial region, and the second surface of the fifth lens 750 may be concave in the paraxial region.

Also, at least one inflection point may be formed on at least one of the first and second surfaces of the fifth lens 750. For example, the first surface of the fifth lens 750 may be convex in the paraxial region and may be concave in a portion other than the paraxial region. The second surface of the fifth lens 750 may be concave in the paraxial region and may be convex in a portion other than the paraxial region.

The sixth lens 760 may have positive refractive power, and the first and second surfaces of the sixth lens 760 may be convex in the paraxial region.

Also, at least one inflection point may be formed on at least one of the first and second surfaces of the sixth lens 760. For example, the first surface of the sixth lens 760 may be convex in the paraxial region and may be concave in a portion other than the paraxial region. The second surface of the sixth lens 760 may be convex in the paraxial region and may be concave in a portion other than the paraxial region.

The seventh lens 770 may have negative refractive power, and the first and second surfaces of the seventh lens 770 may be concave in the paraxial region.

Also, at least one inflection point may be formed on at least one of the first and second surfaces of the seventh lens 770. For example, the first surface of the seventh lens 770 may be concave in the paraxial region and may be convex in a portion other than the paraxial region. The second surface of the seventh lens 770 may be concave in the paraxial region and may be convex in a portion other than the paraxial region.

Each surface of the first lens 710 to the seventh lens 770 may have an aspherical coefficient as in Table 14. For example, both the object-side surface and the image-side surface of the first lens 710 to the seventh lens 770 may be aspherical.

TABLE 14

|  | S1 | S2 | S3 | S4 | S5 | S6 | S7 |
| --- | --- | --- | --- | --- | --- | --- | --- |
| Conic constant(K) | −1.087 | 20.750 | −22.837 | −5.840 | 4.557 | 28.548 | 94.246 |
| 4th coefficient(A) | 1.104E−01 | −1.954E−02 | 4.122E−02 | 2.330E−02 | 7.563E−02 | 7.697E−02 | −2.002E−01 |
| 6th coefficient(B) | −4.799E−03 | −1.265E−02 | 3.576E−03 | 9.512E−03 | 2.268E−02 | 2.038E−02 | −1.206E−02 |
| 8th coefficient(C) | −6.875E−03 | −8.313E−03 | 7.622E−05 | −1.140E−03 | 1.155E−03 | 2.032E−03 | −1.120E−02 |
| 10th coefficient(D) | −4.018E−03 | −2.606E−03 | 1.106E−03 | 5.468E−04 | −1.025E−04 | −8.810E−05 | −1.006E−02 |
| 12th coefficient(E) | −1.903E−03 | −1.188E−03 | −1.209E−04 | 3.477E−04 | −2.007E−04 | −3.538E−04 | −8.335E−03 |
| 14th coefficient(F) | −6.119E−04 | −5.391E−05 | 2.215E−04 | 3.476E−04 | 1.166E−04 | −1.013E−04 | −6.322E−03 |
| 16th coefficient(G) | −1.342E−04 | −1.370E−05 | −6.200E−06 | 1.587E−05 | −2.223E−05 | −9.833E−05 | −4.505E−03 |
| 18th coefficient(H) | 3.707E−05 | 1.455E−05 | 1.537E−05 | −1.907E−05 | 2.337E−05 | −1.187E−05 | −3.143E−03 |
| 20th coefficient(J) | 3.319E−05 | −3.429E−07 | 3.002E−06 | 2.063E−06 | −2.853E−05 | −3.285E−05 | −2.030E−03 |
| 22nd coefficient(L) | 1.927E−05 | −1.507E−05 | 1.029E−06 | 8.780E−06 | 1.847E−05 | 1.010E−05 | −1.277E−03 |
| 24th coefficient(M) | 1.191E−06 | 6.891E−07 | 1.982E−06 | 3.957E−07 | −4.518E−06 | −7.476E−06 | −7.106E−04 |
| 26th coefficient(N) | −3.265E−06 | −6.985E−06 | 3.819E−06 | 4.240E−07 | 1.775E−06 | 3.719E−06 | −3.778E−04 |
| 28th coefficient(O) | −1.387E−05 | −7.458E−07 | −6.887E−06 | 4.880E−07 | −1.607E−06 | −5.168E−06 | −1.606E−04 |
| 30th coefficient(P) | −1.738E−06 | −1.325E−06 | 1.989E−06 | −8.642E−07 | 3.846E−07 | 1.947E−06 | −6.265E−05 |

|  | S8 | S9 | S10 | S11 | S12 | S13 | S14 |
| --- | --- | --- | --- | --- | --- | --- | --- |
| Conic constant(K) | 81.630 | 8.394 | 3.685 | 2.309 | 21.486 | 5.982 | −10.502 |
| 4th coefficient(A) | −3.156E−01 | −9.753E−01 | −1.631E+00 | −2.326E+00 | −8.522E−01 | −1.683E+00 | −3.900E+00 |
| 6th coefficient(B) | 2.910E−02 | 2.290E−02 | 2.633E−01 | 1.892E−01 | 1.551E−02 | 1.181E+00 | 9.829E−01 |
| 8th coefficient(C) | 7.040E−03 | 4.805E−02 | 3.839E−02 | 9.713E−02 | 5.687E−02 | −6.154E−01 | −2.122E−01 |
| 10th coefficient(D) | −1.201E−03 | 3.906E−02 | 1.164E−02 | −1.644E−02 | −1.044E−02 | 2.811E−01 | 1.226E−01 |
| 12th coefficient(E) | −3.042E−03 | −1.219E−03 | −1.732E−02 | −2.036E−02 | 1.747E−02 | −1.141E−01 | −7.211E−02 |
| 14th coefficient(F) | −7.008E−04 | −7.603E−03 | 3.287E−03 | −6.590E−03 | −2.149E−03 | 3.778E−02 | 1.063E−02 |
| 16th coefficient(G) | 4.323E−04 | −4.229E−03 | 6.944E−04 | 5.571E−03 | 1.596E−03 | −6.615E−04 | −1.152E−02 |
| 18th coefficient(H) | 7.588E−04 | −2.991E−04 | −6.043E−03 | 2.073E−03 | 5.262E−04 | −1.758E−03 | 1.143E−02 |
| 20th coefficient(J) | 5.333E−04 | 9.678E−04 | −5.828E−03 | −1.529E−03 | −1.390E−03 | 3.893E−04 | −3.524E−03 |
| 22nd coefficient(L) | 2.516E−04 | 6.296E−04 | −1.260E−03 | −7.385E−04 | −2.783E−04 | 4.451E−03 | 2.115E−03 |
| 24th coefficient(M) | 5.221E−05 | 1.325E−04 | 1.313E−03 | 1.601E−04 | −1.850E−04 | −3.974E−03 | −2.705E−03 |
| 26th coefficient(N) | −3.517E−05 | −7.676E−05 | 1.213E−03 | 1.848E−04 | 3.695E−06 | 2.172E−03 | 8.243E−04 |
| 28th coefficient(O) | −3.780E−05 | −1.013E−04 | 3.735E−04 | 2.972E−05 | 4.478E−05 | −9.904E−04 | −4.293E−07 |
| 30th coefficient(P) | −1.939E−05 | −4.872E−05 | 5.031E−05 | −5.224E−05 | 2.437E−05 | −6.499E−05 | 4.800E−04 |

Figure 14:
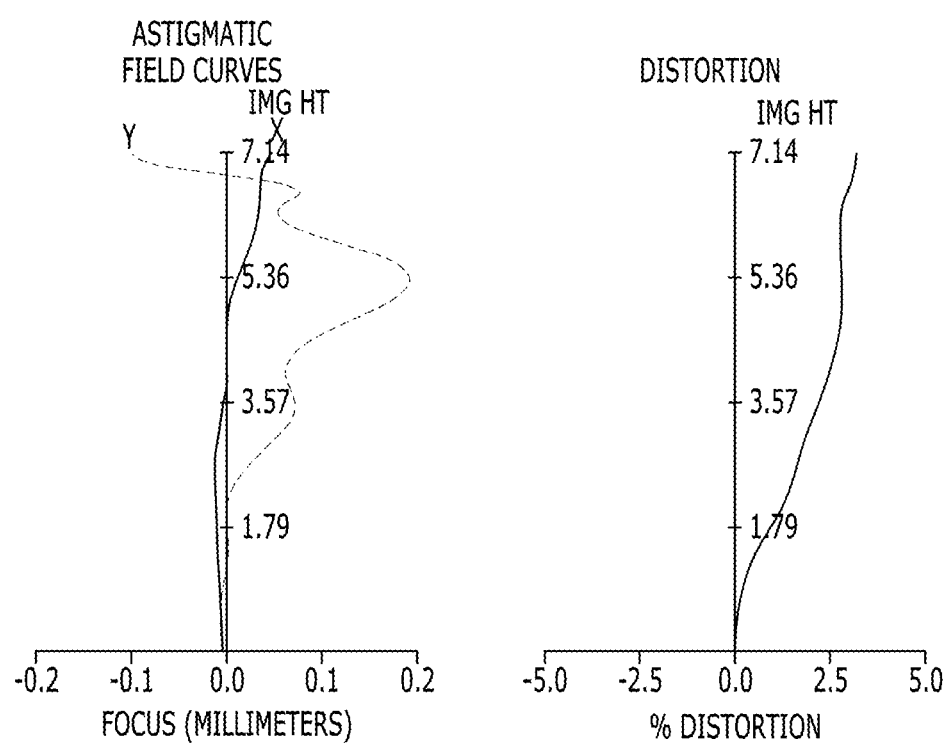
FIG. 14 is curves indicating aberration properties of the optical imaging system illustrated in FIG. 13.

Also, the optical imaging system configured as described above may have the aberration characteristics illustrated in FIG. 14.

Figure 15:
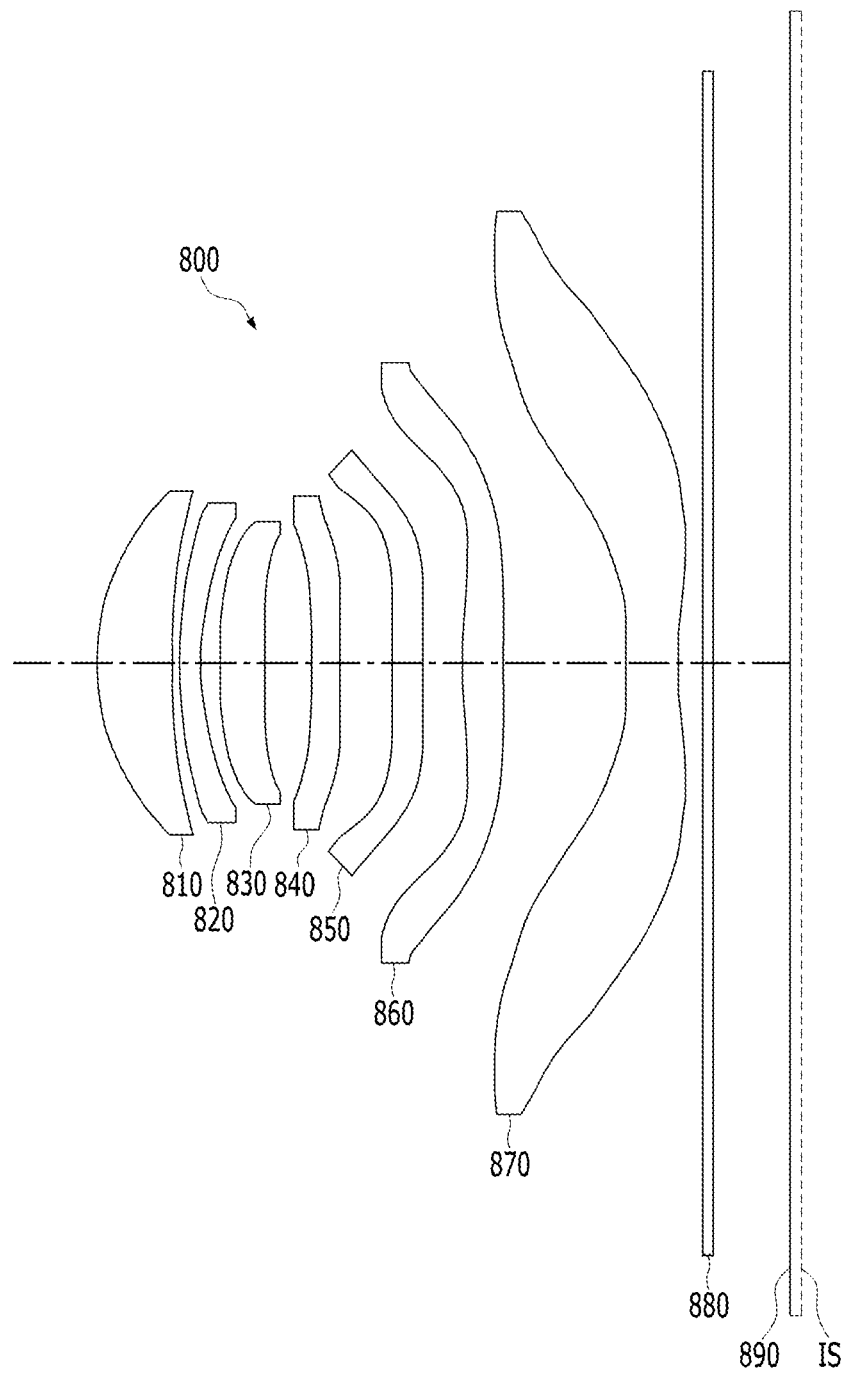
FIG. 15 is a diagram illustrating an optical imaging system according to an eighth example embodiment, according to one or more embodiments.

An optical imaging system 800, according to an eighth example embodiment, will be described with reference to FIGS. 15 and 16.

The optical imaging system 800 in the eighth example embodiment may include an optical system including a first lens 810, a second lens 820, a third lens 830, a fourth lens 840, and a fifth lens 850, a sixth lens 860, and a seventh lens 870, and may further include a filter 880 and an image sensor IS.

The optical imaging system 800 in the seventh example embodiment may form a focus on the imaging plane 890. The imaging plane 890 may refer to a surface on which the optical imaging system may form a focus. For example, the imaging plane 890 may refer to one surface of the image sensor IS on which light is received.

The lens characteristics of each lens (a radius of curvature, a thickness of the lens or a distance between the lenses, a refractive index, an Abbe number, and a focal length) are listed in Table 15.

TABLE 15

| Surface No. | Note | Radius of curvature | Thickness or distance | Refractive index | Abbe number | Focal length |
|---|---|---|---|---|---|---|
| S1 | First lens | 2.643 | 0.837 | 1.544 | 56.1 | 6.463924 |
| S2 | | 9.097 | 0.069 | | | |
| S3 | Second lens | 5.069 | 0.273 | 1.680 | 18.4 | −15.3395 |
| S4 | | 3.310 | 0.193 | | | |
| S5 | Third lens | 6.623 | 0.500 | 1.535 | 56.1 | 23.07 |
| S6 | | 16.452 | 0.530 | | | |
| S7 | Fourth lens | −50.271 | 0.367 | 1.680 | 18.4 | −97.78 |
| S8 | | 105.066 | 0.565 | | | |
| S9 | Fifth lens | 15.031 | 0.340 | 1.614 | 25.9 | −27.446 |
| S10 | | 8.350 | 0.445 | | | |
| S11 | Sixth lens | 5.946 | 0.473 | 1.567 | 38.0 | 9.766 |
| S12 | | −23.667 | 1.357 | | | |
| S13 | Seventh lens | −25.820 | 0.588 | 1.535 | 56.1 | −5.573 |
| S14 | | 3.408 | 0.300 | | | |
| S15 | Filter | Infinity | 0.110 | 1.518 | 64.2 | |
| S16 | | Infinity | 0.818 | | | |
| S17 | Imaging plane | Infinity | | | | |

The total focal length f of the optical imaging system 800 in the eighth example embodiment may be 7.48 mm, the IMG HT may be 7.145 mm, and the FOV may be 86.8°.

In the eighth example embodiment, the first lens 810 may have positive refractive power, the first surface of the first lens 810 may be convex, and the second surface of the first lens 810 may be concave.

The second lens 820 may have negative refractive power, a first surface of the second lens 820 may be convex, and a second surface of the second lens 820 may be concave.

The third lens 830 may have positive refractive power, a first surface of the third lens 830 may be convex, and a second surface of the third lens 830 may be concave.

The fourth lens 840 may have negative refractive power, and first and second surfaces of the fourth lens 840 may be concave.

The fifth lens 850 may have negative refractive power, the first surface of the fifth lens 850 may be convex in the paraxial region, and the second surface of the fifth lens 850 may be concave in the paraxial region.

Also, at least one inflection point may be formed on at least one of the first and second surfaces of the fifth lens 850. For example, the first surface of the fifth lens 850 may be convex in the paraxial region and may be concave in a portion other than the paraxial region. The second surface of the fifth lens 850 may be concave in the paraxial region and may be convex in a portion other than the paraxial region.

The sixth lens 860 may have positive refractive power, and the first and second surfaces of the sixth lens 860 may be convex in the paraxial region.

Also, at least one inflection point may be formed on at least one of the first and second surfaces of the sixth lens 860. For example, the first surface of the sixth lens 860 may be convex in the paraxial region and may be concave in a portion other than the paraxial region. The second surface of the sixth lens 860 may be convex in the paraxial region and may be concave in a portion other than the paraxial region.

The seventh lens 870 may have negative refractive power, and the first and second surfaces of the seventh lens 870 may be concave in the paraxial region.

Also, at least one inflection point may be formed on at least one of the first and second surfaces of the seventh lens 870. For example, the first surface of the seventh lens 870 may be concave in the paraxial region and may be convex in a portion other than the paraxial region. The second surface of the seventh lens 870 may be concave in the paraxial region and may be convex in a portion other than the paraxial region.

Each surface of the first lens 810 to the seventh lens 870 may have an aspherical coefficient as in Table 16. For example, both the object-side surface and the image-side surface of the first lens 810 to the seventh lens 870 may be aspherical.

TABLE 16

| | S1 | S2 | S3 | S4 | S5 | S6 | S7 |
|---|---|---|---|---|---|---|---|
| Conic constant(K) | −1.030 | 21.278 | −22.669 | −5.823 | 5.290 | 31.644 | 99.000 |
| 4th coefficient(A) | 1.123E−01 | −1.977E−02 | 4.165E−02 | 2.363E−02 | 7.599E−02 | 7.687E−02 | −2.004E−01 |
| 6th coefficient(B) | −3.110E−03 | −1.333E−02 | 3.965E−03 | 9.188E−03 | 2.254E−02 | 2.067E−02 | −1.176E−02 |
| 8th coefficient(C) | −6.582E−03 | −1.000E−02 | −4.881E−04 | −1.515E−03 | 1.157E−03 | 2.414E−03 | −1.068E−02 |
| 10th coefficient(D) | −4.129E−03 | −3.108E−03 | 1.149E−03 | 5.439E−04 | −1.578E−04 | −4.776E−05 | −9.893E−03 |
| 12th coefficient(E) | −2.078E−03 | −1.717E−03 | −3.321E−04 | 3.079E−04 | −1.817E−04 | −2.699E−04 | −8.305E−03 |
| 14th coefficient(F) | −7.640E−04 | −8.31IE−05 | 3.388E−04 | 3.871E−04 | 1.034E−04 | −9.825E−05 | −6.435E−03 |
| 16th coefficient(G) | −2.331E−04 | −1.177E−04 | −3.274E−05 | 6.293E−06 | −8.756E−06 | −6.936E−05 | −4.699E−03 |
| 18th coefficient(H) | −3.527E−05 | −4.570E−05 | 1.941E−05 | −2.933E−05 | 1.354E−05 | −1.063E−05 | −3.381E−03 |
| 20th coefficient(J) | −1.932E−05 | −5.697E−05 | −1.124E−05 | −7.879E−06 | −2.302E−05 | −1.372E−05 | −2.249E−03 |
| 22nd coefficient(L) | −1.279E−05 | −4.214E−05 | 2.339E−06 | −6.337E−07 | 1.726E−05 | 2.031E−06 | −1.464E−03 |
| 24th coefficient(M) | −1.809E−05 | −2.465E−05 | −3.699E−06 | −4.210E−06 | −4.390E−06 | −9.870E−06 | −8.472E−04 |
| 26th coefficient(N) | −9.238E−06 | −2.351E−05 | −4.674E−06 | −4.023E−06 | 1.823E−06 | 2.458E−06 | −4.649E−04 |
| 28th coefficient(O) | −1.509E−05 | 6.410E−07 | 1.161E−06 | 9.689E−07 | −1.716E−06 | −3.155E−06 | −2.031E−04 |
| 30th coefficient(P) | −8.110E−06 | −9.842E−06 | −2.129E−06 | −8.954E−07 | 4.179E−07 | 1.812E−06 | −7.759E−05 |

| | S8 | S9 | S10 | S11 | S12 | S13 | S14 |
|---|---|---|---|---|---|---|---|
| Conic constant(K) | 99.000 | 4.104 | 3.989 | 2.302 | 20.424 | 7.369 | −10.889 |
| 4th coefficient(A) | −3.152E−01 | −9.753E−01 | −1.628E+00 | −2.330E+00 | −8.500E−01 | −1.696E+00 | −3.907E+00 |
| 6th coefficient(B) | 2.966E−02 | 2.253E−02 | 2.645E−01 | 1.896E−01 | 1.589E−02 | 1.188E+00 | 9.846E−01 |
| 8th coefficient(C) | 8.541E−03 | 4.963E−02 | 3.777E−02 | 9.740E−02 | 5.528E−02 | −6.134E−01 | −1.999E−01 |
| 10th coefficient(D) | −2.002E−04 | 3.986E−02 | 1.100E−02 | −1.504E−02 | −9.597E−03 | 2.824E−01 | 1.244E−01 |
| 12th coefficient(E) | −3.064E−03 | −8.465E−04 | −1.692E−02 | −2.052E−02 | 1.744E−02 | −1.178E−01 | −7.444E−02 |
| 14th coefficient(F) | −1.334E−03 | −7.361E−03 | 3.843E−03 | −6.911E−03 | −2.686E−03 | 3.805E−02 | 9.883E−03 |
| 16th coefficient(G) | −4.200E−04 | −4.409E−03 | 4.461E−04 | 5.531E−03 | 1.450E−03 | −5.655E−06 | −1.359E−02 |
| 18th coefficient(H) | 6.106E−05 | −7.121E−04 | −6.154E−03 | 2.082E−03 | 5.274E−04 | −4.779E−04 | 1.083E−02 |
| 20th coefficient(J) | 3.439E−05 | 6.578E−04 | −5.514E−03 | −1.569E−03 | −1.449E−03 | 4.736E−04 | −3.994E−03 |
| 22nd coefficient(L) | −4.244E−05 | 5.988E−04 | −1.058E−03 | −5.876E−04 | −1.249E−04 | 4.918E−03 | 2.664E−03 |
| 24th coefficient(M) | −1.024E−04 | 2.292E−04 | 9.785E−04 | 1.267E−04 | −1.872E−04 | −4.315E−03 | −2.200E−03 |
| 26th coefficient(N) | −9.002E−05 | 5.507E−06 | 7.460E−04 | 1.740E−04 | 5.198E−05 | 2.215E−03 | 1.029E−03 |
| 28th coefficient(O) | −5.681E−05 | −7.276E−05 | 8.304E−05 | 1.613E−05 | 3.724E−05 | −1.154E−03 | 7.107E−05 |
| 30th coefficient(P) | −1.483E−05 | −5.366E−05 | −1.957E−05 | −4.312E−05 | 8.562E−06 | −1.384E−04 | 5.844E−04 |

Figure 16:
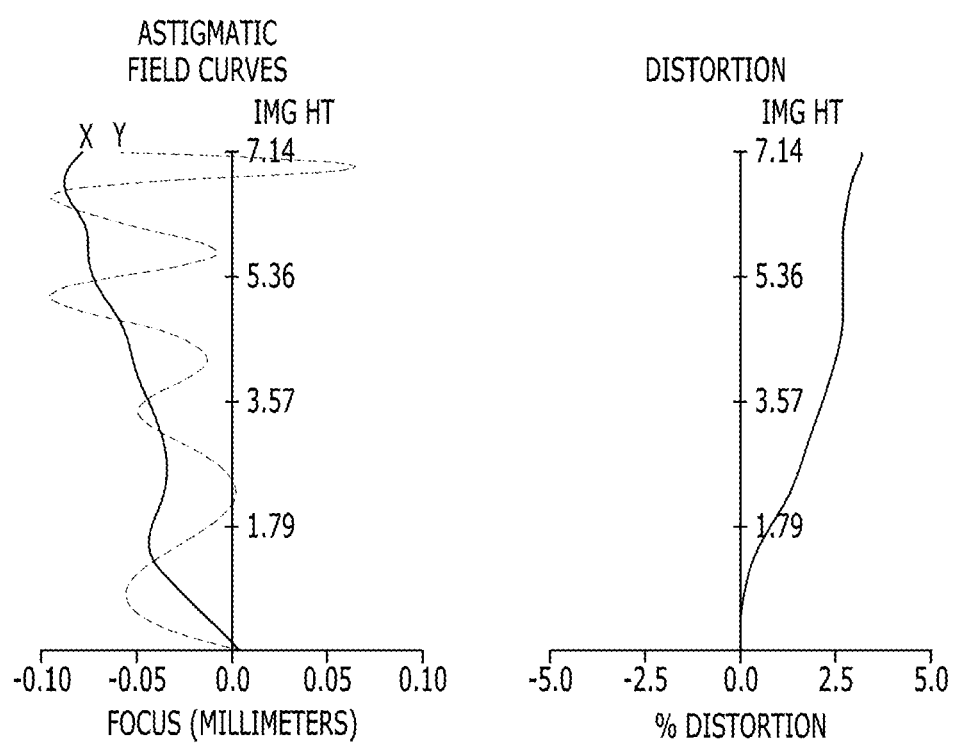
FIG. 16 is curves indicating aberration properties of the optical imaging system illustrated in FIG. 15.

Also, the optical imaging system configured as described above may have the aberration characteristics illustrated in FIG. 16.

Figure 17:
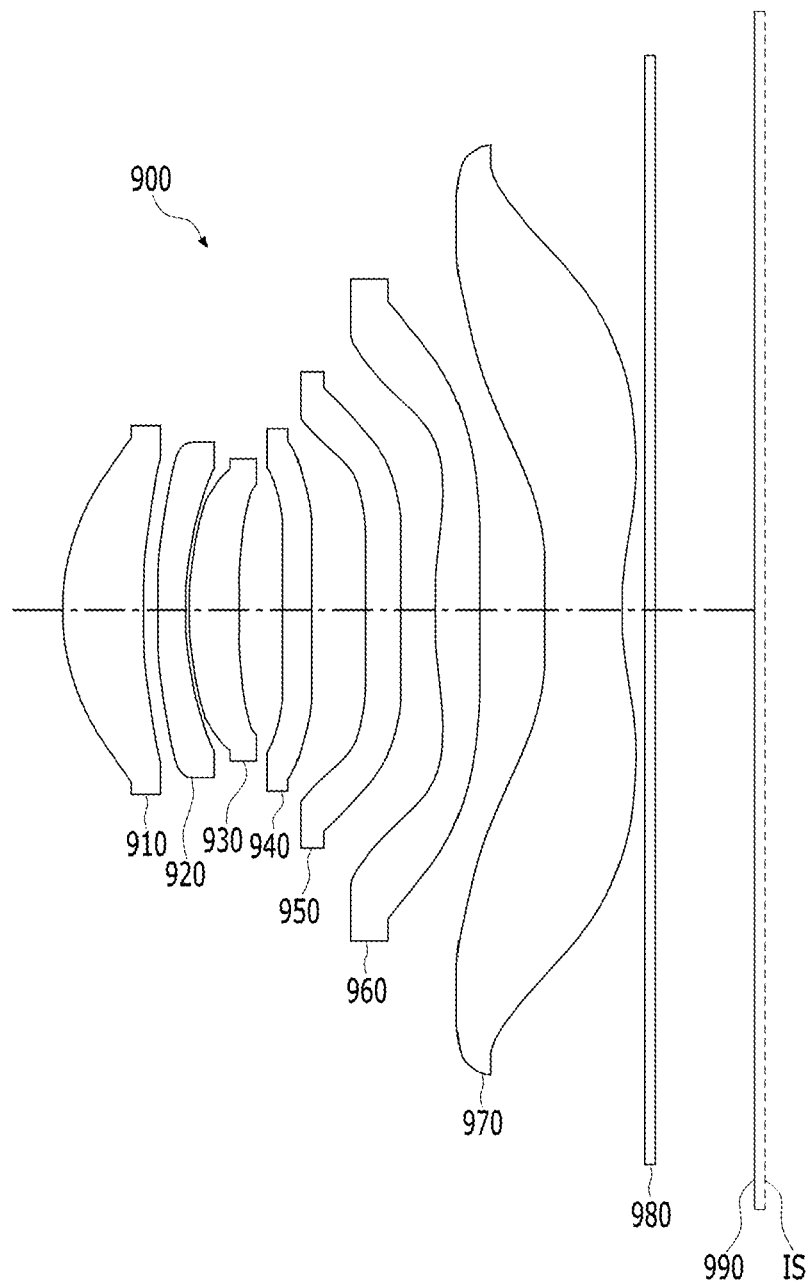
FIG. 17 is a diagram illustrating an optical imaging system according to a ninth example embodiment, according to one or more embodiments.

An optical imaging system 900, according to a ninth example embodiment, will be described with reference to FIGS. 17 and 18.

The optical imaging system 900 in the ninth example embodiment may include an optical system including a first lens 910, a second lens 920, a third lens 930, a fourth lens 940, a fifth lens 950, a sixth lens 960, and a seventh lens 970, and may further include a filter 980 and an image sensor IS.

The optical imaging system 900 in the seventh example embodiment may form a focus on the imaging plane 990. The imaging plane 990 may refer to a surface on which the optical imaging system may form a focus. For example, the imaging plane 990 may refer to one surface of the image sensor IS on which light is received.

The lens characteristics of each lens (a radius of curvature, a thickness of the lens or a distance between the lenses, a refractive index, an Abbe number, and a focal length) are listed in Table 17.

TABLE 17

| Surface No. | Note | Radius of curvature | Thickness or distance | Refractive index | Abbe number | Focal length |
|---|---|---|---|---|---|---|
| S1 | First lens | 1.742 | 0.608 | 1.544 | 56.1 | 4.2053 |
| S2 | | 6.323 | 0.100 | | | |
| S3 | Second lens | 5.728 | 0.200 | 1.680 | 18.4 | −7.86951 |
| S4 | | 2.746 | 0.031 | | | |
| S5 | Third lens | 3.196 | 0.355 | 1.535 | 56.1 | 10.76147 |
| S6 | | 6.869 | 0.332 | | | |
| S7 | Fourth lens | 24.890 | 0.210 | 1.680 | 18.4 | −82.697 |
| S8 | | 17.264 | 0.407 | | | |
| S9 | Fifth lens | 14.191 | 0.259 | 1.614 | 25.9 | −15.2761 |
| S10 | | 5.641 | 0.267 | | | |
| S11 | Sixth lens | 3.893 | 0.340 | 1.567 | 38.0 | 5.69698 |
| S12 | | −19.104 | 0.483 | | | |
| S13 | Seventh lens | 18.393 | 0.580 | 1.544 | 56.1 | −3.95785 |
| S14 | | 1.913 | 0.161 | | | |
| S15 | Filter | Infinity | 0.110 | 1.518 | 64.2 | |
| S16 | | Infinity | 0.717 | | | |
| S17 | Imaging plane | Infinity | | | | |

The total focal length f of the optical imaging system 900 in the ninth example embodiment may be 4.807 mm, the IMG HT may be 4.807 mm, and the FOV may be 85°.

In the ninth example embodiment, the first lens 910 may have positive refractive power, the first surface of the first lens 910 may be convex, and the second surface of the first lens 910 may be concave.

The second lens 920 may have negative refractive power, a first surface of the second lens 920 may be convex, and a second surface of the second lens 920 may be concave.

The third lens 930 may have positive refractive power, a first surface of the third lens 930 may be convex, and a second surface of the third lens 930 may be concave.

The fourth lens 940 may have negative refractive power, the first surface of the fourth lens 940 may be convex and the second surface of the fourth lens 940 may be concave.

The fifth lens 950 may have negative refractive power, the first surface of the fifth lens 950 may be convex in the paraxial region, and the second surface of the fifth lens 950 may be concave in the paraxial region.

Also, at least one inflection point may be formed on at least one of the first and second surfaces of the fifth lens 950. For example, the first surface of the fifth lens 950 may be convex in the paraxial region and may be concave in a portion other than the paraxial region. The second surface of the fifth lens 950 may be concave in the paraxial region and may be convex in a portion other than the paraxial region.

The sixth lens 960 may have positive refractive power, and the first and second surfaces of the sixth lens 960 may be convex in the paraxial region.

Also, at least one inflection point may be formed on at least one of the first and second surfaces of the sixth lens 960. For example, the first surface of the sixth lens 960 may be convex in the paraxial region and may be concave in a portion other than the paraxial region. The second surface of the sixth lens 960 may be convex in the paraxial region and may be concave in a portion other than the paraxial region.

The seventh lens 970 may have negative refractive power, the first surface of the seventh lens 970 may be convex in the paraxial region, and the second surface of the seventh lens 970 may be concave in the paraxial region.

Also, at least one inflection point may be formed on at least one of the first and second surfaces of the seventh lens 970. For example, the first surface of the seventh lens 970 may be convex in the paraxial region and may be concave in a portion other than the paraxial region. The second surface of the seventh lens 970 may be concave in the paraxial region and may be convex in a portion other than the paraxial region.

Each surface of the first lens 910 to the seventh lens 970 may have an aspherical coefficient as in Table 18. For example, both the object-side surface and the image-side surface of the first lens 910 to the seventh lens 970 may be aspherical.

TABLE 18

| | S1 | S2 | S3 | S4 | S5 | S6 | S7 |
|---|---|---|---|---|---|---|---|
| Conic constant(K) | −1.392 | 23.221 | −23.029 | −4.698 | 0.000 | 0.000 | 0.000 |
| 4th coefficient(A) | 5.302E−02 | −2.581E−02 | 2.925E−02 | 1.901E−02 | 2.180E−02 | 3.613E−02 | −1.284E−01 |
| 6th coefficient(B) | −7.942E−03 | −1.104E−02 | −2.014E−03 | 4.148E−03 | 1.793E−02 | 1.151E−02 | −8.042E−03 |
| 8th coefficient(C) | −1.729E−03 | 1.580E−04 | 1.028E−03 | −1.156E−04 | 5.894E−04 | 1.188E−03 | −1.888E−03 |
| 10th coefficient(D) | −5.372E−04 | −5.970E−04 | 2.359E−04 | −9.511E−04 | −2.824E−04 | 4.936E−04 | −3.182E−03 |
| 12th coefficient(E) | 7.368E−05 | 6.114E−05 | −2.014E−04 | 4.637E−05 | −2.134E−04 | −6.169E−05 | −2.073E−03 |
| 14th coefficient(F) | −7.417E−05 | −1.529E−04 | 4.658E−05 | 4.221E−05 | 7.720E−05 | 8.482E−05 | −1.872E−03 |
| 16th coefficient(G) | 3.809E−05 | 5.854E−05 | −1.965E−05 | 1.292E−04 | 8.884E−06 | −5.462E−05 | −9.71 1E−04 |
| 18th coefficient(H) | −4.762E−05 | −3.580E−05 | 3.084E−05 | −5.206E−05 | 2.246E−05 | 4.319E−05 | −7.691E−04 |

TABLE 18-continued

| | | | | | | | |
|---|---|---|---|---|---|---|---|
| 20th coefficient(J) | 3.315E−05 | 2.039E−05 | −1.205E−05 | 2.067E−05 | −1.823E−05 | −2.242E−05 | −3.407E−04 |
| 22nd coefficient(L) | −2.729E−05 | −8.078E−06 | 1.770E−06 | −2.094E−05 | 1.074E−05 | 1.237E−05 | −2.927E−04 |
| 24th coefficient(M) | 1.760E−05 | 3.563E−06 | −1.968E−07 | 1.254E−05 | −4.728E−06 | −1.168E−05 | −1.286E−04 |
| 26th coefficient(N) | −4.510E−06 | −4.624E−06 | 7.937E−07 | −5.789E−06 | 4.719E−06 | 4.219E−06 | −1.059E−04 |
| 28th coefficient(O) | −3.123E−07 | 2.822E−06 | −9.780E−07 | 5.448E−07 | −3.136E−06 | −3.034E−07 | −3.119E−05 |
| 30th coefficient(P) | 2.261E−07 | −5.768E−07 | 2.768E−07 | 3.287E−07 | 6.343E−07 | 2.050E−07 | −2.051E−05 |

| | S8 | S9 | S10 | S11 | S12 | S13 | S14 |
|---|---|---|---|---|---|---|---|
| Conic constant(K) | 0.000 | 0.000 | 0.000 | 2.266 | 40.958 | 0.000 | −11.103 |
| 4th coefficient(A) | −2.014E−01 | −5.810E−01 | −1.027E+00 | −1.466E+00 | −4.951E−01 | −1.410E+00 | −2.478E+00 |
| 6th coefficient(B) | 1.330E−02 | −7.437E−03 | 1.137E−01 | 6.172E−02 | −8.312E−03 | 6.933E−01 | 5.864E−01 |
| 8th coefficient(C) | 6.226E−03 | 2.931E−02 | 6.481E−03 | 5.748E−02 | 2.933E−02 | −3.324E−01 | −7.973E−02 |
| 10th coefficient(D) | 4.225E−04 | 2.088E−02 | 4.822E−03 | −7.104E−03 | −6.279E−04 | 1.712E−01 | 7.419E−02 |
| 12th coefficient(E) | −2.033E−03 | −1.219E−03 | −6.050E−03 | −1.281E−02 | 7.323E−04 | −8.433E−02 | −4.491E−02 |
| 14th coefficient(F) | −1.021E−03 | −5.621E−03 | 4.319E−03 | −1.910E−03 | −1.974E−04 | 3.641E−02 | 1.544E−02 |
| 16th coefficient(G) | −3.263E−04 | −1.934E−03 | 2.654E−03 | 4.363E−03 | 6.691E−04 | −1.268E−02 | −4.420E−03 |
| 18th coefficient(H) | 1.028E−04 | −8.058E−05 | −3.372E−03 | 5.985E−04 | 9.890E−05 | 2.147E−03 | 4.366E−03 |
| 20th coefficient(J) | 9.832E−05 | 7.087E−04 | −3.891E−03 | −1.108E−03 | −2.506E−04 | 5.232E−04 | −2.084E−04 |
| 22nd coefficient(L) | 7.072E−05 | 2.604E−04 | −2.169E−03 | −5.015E−04 | 8.532E−05 | 1.559E−04 | 2.050E−03 |
| 24th coefficient(M) | 5.697E−07 | 1.740E−04 | −9.023E−04 | 1.589E−04 | −1.933E−04 | −8.163E−04 | 6.968E−04 |
| 26th coefficient(N) | −8.130E−06 | −1.620E−05 | −9.251E−04 | 1.586E−04 | 8.987E−05 | 7.713E−04 | 3.073E−04 |
| 28th coefficient(O) | −8.439E−06 | −3.225E−05 | −7.481E−04 | 3.238E−06 | 0.000E+00 | −3.412E−04 | −4.236E−04 |
| 30th coefficient(P) | 2.942E−07 | −4.885E−05 | −3.420E−04 | −2.971E−05 | 0.000E+00 | 5.761E−05 | −2.284E−04 |

Figure 18:
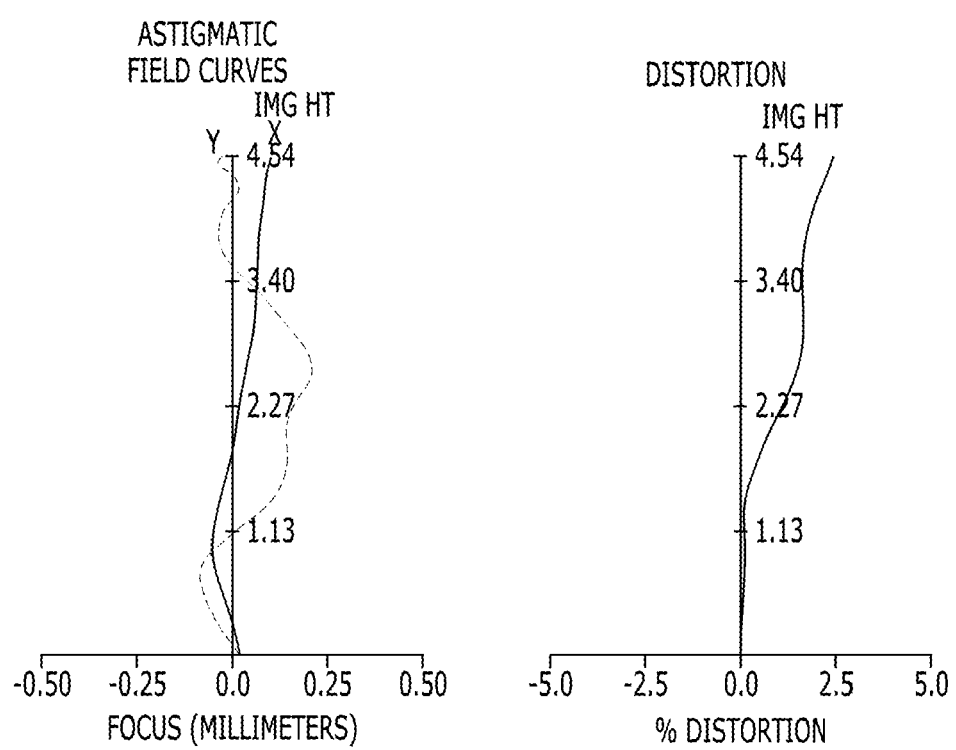
FIG. 18 is curves indicating aberration properties of the optical imaging system illustrated in FIG. 17.

Also, the optical imaging system configured as described above may have the aberration characteristics illustrated in FIG. 18.

Figure 19:
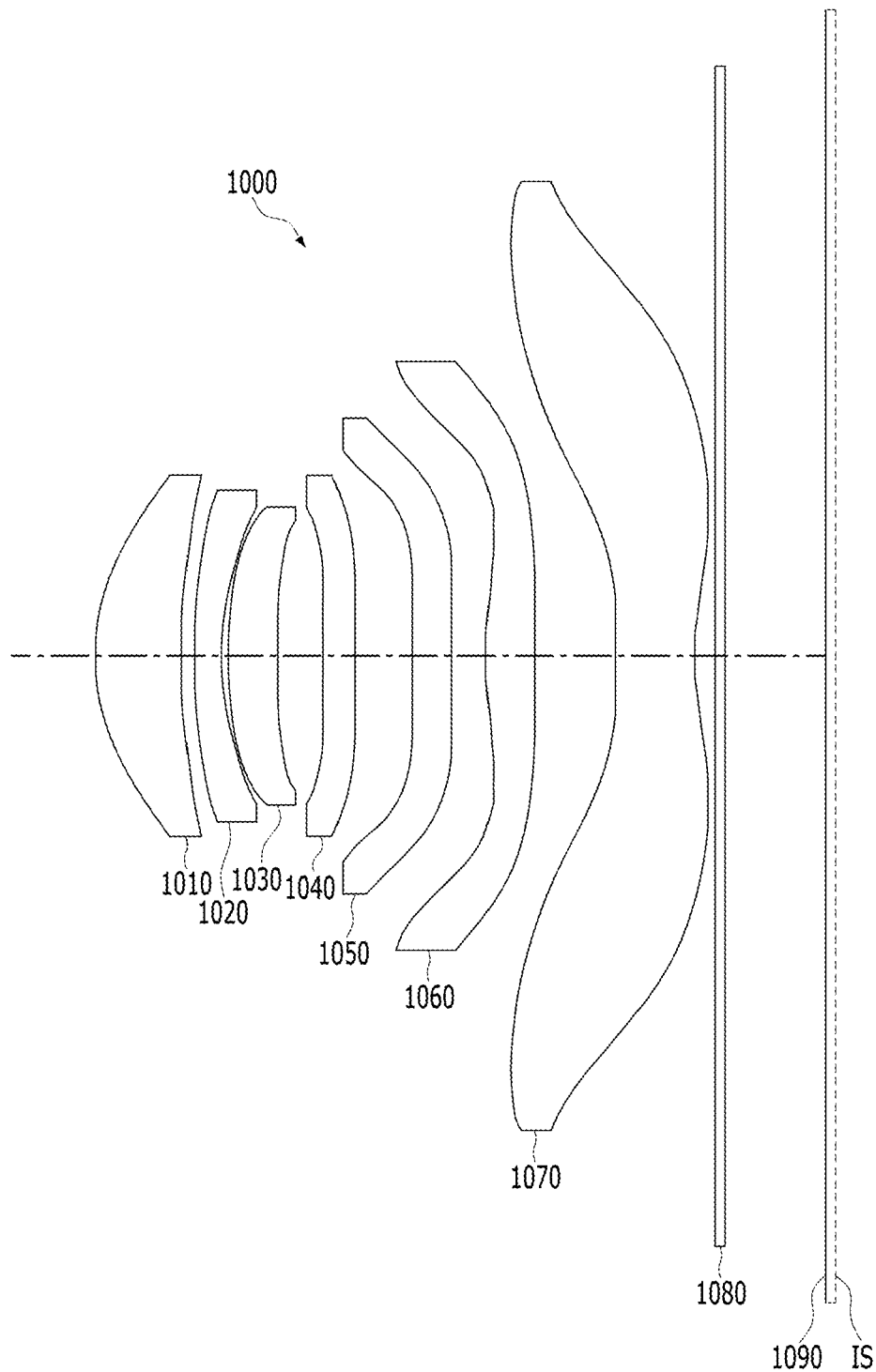
FIG. 19 is a diagram illustrating an optical imaging system according to a tenth example embodiment, according to one or more embodiments.

An optical imaging system 1000, according to a tenth example embodiment, will be described with reference to FIGS. 19 and 20.

The optical imaging system 1000 in the ninth example embodiment may include an optical system including a first lens 1010, a second lens 1020, a third lens 1030, a fourth lens 1040, a fifth lens 1050, a sixth lens 1060, and a seventh lens 1070, and may further include a filter 1080 and an image sensor IS.

The optical imaging system 1000 in the seventh example embodiment may form a focus on the imaging plane 1090. The imaging plane 1090 may refer to a surface on which the optical imaging system may form a focus. For example, the imaging plane 1090 may refer to one surface of the image sensor IS on which light is received.

The lens characteristics of each lens (a radius of curvature, a thickness of the lens or a distance between the lenses, a refractive index, an Abbe number, and a focal length) are listed in Table 19.

TABLE 19

| Surface No. | Note | Radius of curvature | Thickness or distance | Refractive index | Abbe number | Focal length |
|---|---|---|---|---|---|---|
| S1 | First lens | 1.965 | 0.684 | 1.544 | 56.1 | 4.736584 |
| S2 | | 7.168 | 0.100 | | | |
| S3 | Second lens | 5.245 | 0.220 | 1.680 | 18.4 | −8.53077 |
| S4 | | 2.724 | 0.057 | | | |
| S5 | Third lens | 3.615 | 0.390 | 1.535 | 56.1 | 12.14607 |
| S6 | | 7.802 | 0.367 | | | |
| S7 | Fourth lens | 32.275 | 0.250 | 1.680 | 18.4 | −144.428 |
| S8 | | 24.295 | 0.465 | | | |
| S9 | Fifth lens | 16.081 | 0.300 | 1.614 | 25.9 | −17.6063 |
| S10 | | 6.456 | 0.288 | | | |
| S11 | Sixth lens | 4.378 | 0.400 | 1.567 | 38.0 | 6.398205 |

TABLE 19-continued

| Surface No. | Note | Radius of curvature | Thickness or distance | Refractive index | Abbe number | Focal length |
|---|---|---|---|---|---|---|
| S12 | | −21.282 | 0.644 | | | |
| S13 | Seventh lens | 74.348 | 0.633 | 1.544 | 56.1 | −4.2989 |
| S14 | | 2.270 | 0.161 | | | |
| S15 | Filter | Infinity | 0.110 | 1.518 | 64.2 | |
| S16 | | Infinity | 0.751 | | | |
| S17 | Imaging plane | Infinity | | | | |

The total focal length f of the optical imaging system 1000 in the tenth example embodiment may be 5.402 mm, the IMG HT may be 5.402 mm, and the FOV may be 85°.

In the tenth example embodiment, the first lens 1010 may have positive refractive power, the first surface of the first lens 1010 may be convex, and the second surface of the first lens 1010 may be concave.

The second lens 1020 may have negative refractive power, a first surface of the second lens 1020 may be convex, and a second surface of the second lens 1020 may be concave.

The third lens 1030 may have positive refractive power, a first surface of the third lens 1030 may be convex, and a second surface of the third lens 1030 may be concave.

The fourth lens 1040 may have negative refractive power, the first surface of the fourth lens 1040 may be convex, and the second surface of the fourth lens 940 may be concave.

The fifth lens 1050 may have negative refractive power, the first surface of the fifth lens 1050 may be convex in the paraxial region, and the second surface of the fifth lens 1050 may be concave in the paraxial region.

Also, at least one inflection point may be formed on at least one of the first and second surfaces of the fifth lens 1050. For example, the first surface of the fifth lens 1050 may be convex in the paraxial region and may be concave in a portion other than the paraxial region. The second surface of the fifth lens 1050 may be concave in the paraxial region and may be convex in a portion other than the paraxial region.

The sixth lens 1060 may have positive refractive power, and the first and second surfaces of the sixth lens 1060 may be convex in the paraxial region.

Also, at least one inflection point may be formed on at least one of the first and second surfaces of the sixth lens 1060. For example, the first surface of the sixth lens 1060 may be convex in the paraxial region and may be concave in a portion other than the paraxial region. The second surface of the sixth lens 1060 may be convex in the paraxial region and may be concave in a portion other than the paraxial region.

The seventh lens 1070 may have negative refractive power, the first surface of the seventh lens 1070 may be convex in the paraxial region, and the second surface of the seventh lens 1070 may be concave in the paraxial region.

Also, at least one inflection point may be formed on at least one of the first and second surfaces of the seventh lens 1070. For example, the first surface of the seventh lens 1070 may be convex in the paraxial region and may be concave in a portion other than the paraxial region. The second surface of the seventh lens 1070 may be concave in the paraxial region and may be convex in a portion other than the paraxial region.

Each surface of the first lens 1010 to the seventh lens 1070 may have an aspherical coefficient as in Table 20. For example, both the object-side surface and the image-side surface of the first lens 1010 to the seventh lens 1070 may be aspherical.

TABLE 20

| | S1 | S2 | S3 | S4 | S5 | S6 | S7 |
|---|---|---|---|---|---|---|---|
| Conic constant(K) | −1.328 | 23.161 | −20.854 | −4.978 | 0.000 | 0.000 | 0.000 |
| 4th coefficient(A) | 6.330E−02 | −2.842E−02 | 3.516E−02 | 2.004E−02 | 2.767E−02 | 3.874E−02 | −1.473E−01 |
| 6th coefficient(B) | −8.539E−03 | −1.252E−02 | −3.574E−04 | 5.203E−03 | 2.094E−02 | 1.392E−02 | −5.808E−03 |
| 8th coefficient(C) | −1.357E−03 | −1.397E−04 | 1.009E−03 | −5.272E−05 | 1.442E−03 | 1.609E−03 | −3.342E−03 |
| 10th coefficient(D) | −7.471E−04 | −7.238E−04 | 2.811E−04 | −9.669E−04 | −3.923E−04 | 5.579E−04 | −3.677E−03 |
| 12th coefficient(E) | 1.416E−04 | −1.898E−05 | −1.428E−04 | 6.439E−06 | −2.452E−04 | −8.819E−05 | −2.826E−03 |
| 14th coefficient(F) | −1.230E−04 | −1.363E−04 | 5.395E−05 | 7.725E−05 | 1.140E−04 | 1.019E−04 | −2.116E−03 |
| 16th coefficient(G) | 7.915E−05 | 4.569E−05 | −1.996E−05 | 1.184E−04 | 1.185E−05 | −6.324E−05 | −1.314E−03 |
| 18th coefficient(H) | −7.077E−05 | −3.576E−05 | 1.979E−05 | −4.783E−05 | 2.647E−05 | 4.106E−05 | −8.875E−04 |
| 20th coefficient(J) | 4.256E−05 | 2.240E−05 | −6.987E−06 | 2.088E−05 | −2.124E−05 | −2.314E−05 | −5.094E−04 |
| 22nd coefficient(L) | −3.072E−05 | −8.907E−06 | 1.290E−06 | −2.240E−05 | 1.186E−05 | 2.232E−05 | −3.555E−04 |
| 24th coefficient(M) | 2.004E−05 | 3.920E−06 | 1.282E−07 | 1.370E−05 | −5.498E−06 | −9.938E−06 | −1.983E−04 |
| 26th coefficient(N) | −5.099E−06 | −5.227E−06 | 8.235E−07 | −6.162E−06 | 5.242E−06 | 1.407E−06 | −1.253E−04 |

TABLE 20-continued

|  |  |  |  |  |  |  |  |
|---|---|---|---|---|---|---|---|
| 28th coefficient(O) | −4.835E−07 | 3.150E−06 | −1.197E−06 | 6.003E−07 | −3.533E−06 | −5.023E−06 | −5.210E−05 |
| 30th coefficient(P) | 2.716E−07 | −6.894E−07 | 3.198E−07 | 2.784E−07 | 7.362E−07 | 2.731E−06 | −2.698E−05 |

|  | S8 | S9 | S10 | S11 | S12 | S13 | S14 |
|---|---|---|---|---|---|---|---|
| Conic constant(K) | 0.000 | 0.000 | 0.000 | 2.269 | 42.013 | 0.000 | −13.288 |
| 4th coefficient(A) | −2.105E−01 | −6.548E−01 | −1.176E+00 | −1.646E+00 | −5.719E−01 | −1.440E+00 | −2.704E+00 |
| 6th coefficient(B) | 1.657E−02 | −1.593E−03 | 1.175E−01 | 6.131E−02 | −1.441E−02 | 7.863E−01 | 6.517E−01 |
| 8th coefficient(C) | 5.945E−03 | 3.277E−02 | 6.459E−03 | 6.606E−02 | 3.546E−02 | −3.870E−01 | −1.118E−01 |
| 10th coefficient(D) | −6.151E−05 | 2.179E−02 | 5.930E−04 | −7.464E−03 | −4.208E−04 | 1.943E−01 | 7.849E−02 |
| 12th coefficient(E) | −1.727E−03 | −8.817E−04 | −7.778E−03 | −1.465E−02 | −1.978E−03 | −9.163E−02 | −4.484E−02 |
| 14th coefficient(F) | −7.605E−04 | −5.180E−03 | 2.661E−03 | −2.016E−03 | −3.240E−04 | 3.866E−02 | 1.617E−02 |
| 16th coefficient(G) | −1.818E−04 | −2.387E−03 | 1.996E−03 | 4.938E−03 | 1.966E−03 | −1.378E−02 | −4.555E−03 |
| 18th coefficient(H) | 1.041E−04 | −1.970E−04 | −2.279E−03 | 6.776E−04 | 5.443E−04 | 1.403E−03 | 3.840E−03 |
| 20th coefficient(J) | 5.564E−05 | 5.648E−04 | −2.698E−03 | −1.254E−03 | −3.366E−04 | 1.399E−03 | 5.054E−04 |
| 22nd coefficient(L) | 3.239E−05 | 3.475E−04 | −1.137E−03 | −5.492E−04 | 3.594E−05 | −7.854E−05 | 2.328E−03 |
| 24th coefficient(M) | −1.154E−06 | 8.681E−05 | −5.317E−05 | 1.644E−04 | −2.102E−04 | −7.990E−04 | 2.055E−03 |
| 26th coefficient(N) | 4.418E−07 | −2.762E−05 | 1.233E−04 | 1.837E−04 | 7.283E−05 | 9.093E−04 | 1.934E−03 |
| 28th coefficient(O) | −2.697E−06 | −3.255E−05 | −2.849E−05 | −1.493E−06 | 0.000E+00 | −3.879E−04 | 8.124E−04 |
| 30th coefficient(P) | −8.604E−07 | −7.194E−06 | −2.097E−06 | −3.544E−05 | 0.000E+00 | 5.069E−05 | 1.527E−04 |

Figure 20:
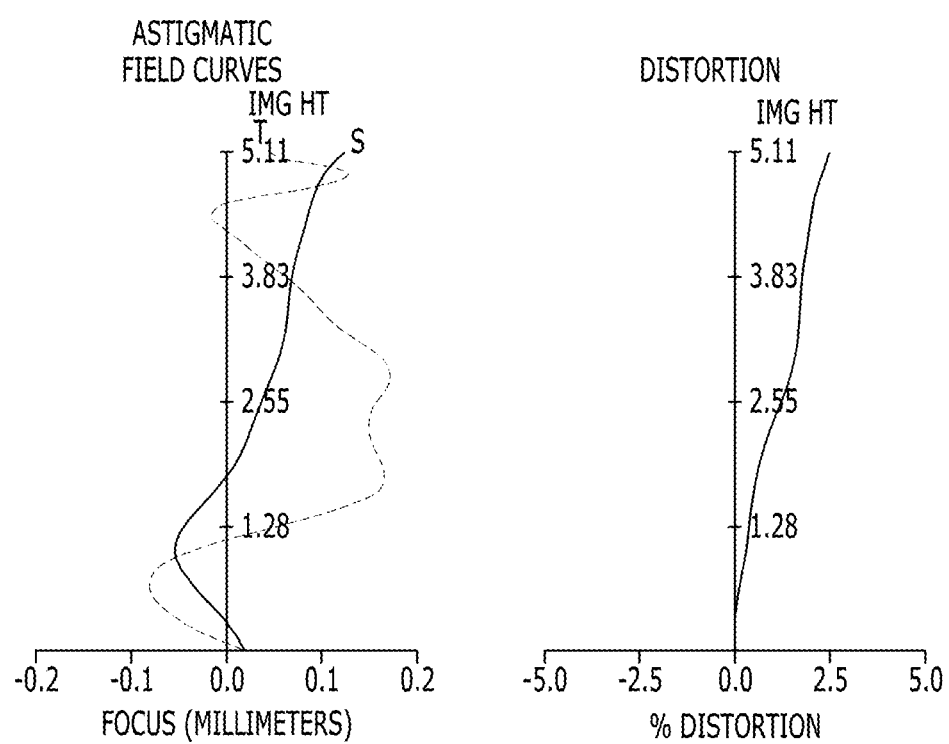
FIG. 20 is curves indicating aberration properties of the optical imaging system illustrated in FIG. 19.

Also, the optical imaging system configured as described above may have the aberration characteristics illustrated in FIG. 20.

According to the aforementioned example embodiments, the optical imaging system may have a reduced size while implementing high resolution.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
   a first lens, a second lens, a third lens, a fourth lens, a fifth lens, a sixth lens and a seventh lens disposed in order from an object side,
   wherein the first lens has positive refractive power, and the second lens has negative refractive power, and
   wherein TTL/(2×IMG HT)<0.6 and −0.15<SAG52/f<0 are satisfied, where TTL is a distance from an object-side surface of the first lens to an imaging plane on an optical axis, IMG HT is half a diagonal length of the imaging plane, SAG52 is a fifth SAG value at an end of an effective diameter of an image-side surface of the fifth lens, and f is a total focal length the optical imaging system, and
   wherein (TTL/(2×IMG HT)×(TTL/D)<0.62 is satisfied.

2. The optical imaging system of claim 1,
   wherein either one or both of −0.15<SAG62/f<0 and −0.25<SAG72/f<0 are satisfied, and
   wherein SAG62 is a sixth SAG value at an end of an effective diameter of an image-side surface of the sixth lens, and SAG72 is a seventh SAG value at an end of the effective diameter of an image-side surface of the seventh lens.

3. The optical imaging system of claim 1, wherein at least three of the first to seventh lenses have a refractive index greater than 1.61.

4. The optical imaging system of claim 3, wherein each of the lenses having a refractive index greater than 1.61 has negative refractive power.

5. The optical imaging system of claim 3, wherein each of the second lens and the fourth lens has a refractive index greater than 1.67 and negative refractive power.

6. The optical imaging system of claim 1,
   wherein any one or any combination of any two or more of 25<v1-v2<45, 25<v1-v4<45 and 15<v1-v6<25 are satisfied, and
   wherein v1 is a first Abbe number of the first lens, v2 is a second Abbe number of the second lens, v4 is a fourth Abbe number of the fourth lens, and v6 is sixth Abbe number of the sixth lens.

7. The optical imaging system of claim 1,
wherein $0<f1/f<1.4$ and $-10<f2/f<0$ are satisfied, where f1 is a first focal length of the first lens, and f2 is a second focal length of the second lens.

8. The optical imaging system of claim 7, wherein $0<f3/f<50$ and $-50<f4/f<0$ are satisfied, where f3 is a third focal length of the third lens, and f4 is a fourth focal length of the fourth lens.

9. The optical imaging system of claim 7, wherein $|f5/f|>3$, $0<f6/f<1.4$, and $-0.9<f7/f<0$ are satisfied, where f5 is a fifth focal length of the fifth lens, f6 is a sixth focal length of the sixth lens, and f7 is a seventh focal length of the seventh lens.

10. The optical imaging system of claim 1, wherein $TTL/f<1.3$ and $BFL/f<0.3$ are satisfied, where BFL is a distance from an image-side surface of the seventh lens to the imaging plane on the optical axis.

11. The optical imaging system of claim 1, wherein $D1/f<0.1$ is satisfied, where D1 is a distance between an image-side surface of the first lens and an object-side surface of the second lens on the optical axis.

12. The optical imaging system of claim 1, wherein $FOV\times((2\times IMG\ HT)/f)\leq 170°$ is satisfied, and FOV is a field of view of the optical imaging system.

13. The optical imaging system of claim 1, wherein $n2+n4+n5>4.8$ is satisfied, where n2 is a second refractive index of the second lens, n4 is a fourth refractive index of the fourth lens, and n5 is a fifth refractive index of the fifth lens.

14. The optical imaging system of claim 1, wherein the third lens has positive refractive power, the fourth lens has negative refractive power, the fifth lens has negative refractive power, the sixth lens has positive refractive power, and the seventh lens has negative refractive power.

15. The optical imaging system of claim 14,
wherein the first lens has a convex object-side surface and a concave image-side surface,
wherein the second lens has a convex object-side surface and a concave image-side surface, and
wherein the third lens has a convex object-side surface and a concave image-side surface.

* * * * *